(12) United States Patent
Iida et al.

(10) Patent No.: US 7,343,727 B2
(45) Date of Patent: Mar. 18, 2008

(54) LAWN MOWER EXHAUST AIR RETURN

(75) Inventors: Tetsuo Iida, Wako (JP); Kenzo Shimada, Wako (JP); Shoji Hasei, Wako (JP); Yoshio Yoshihara, Wako (JP); Ai Amano, Wako (JP)

(73) Assignee: Honda Motor Co., Ltd. (JP)

( * ) Notice: Subject to any disclaimer, the term of this patent is extended or adjusted under 35 U.S.C. 154(b) by 213 days.

(21) Appl. No.: 11/150,579

(22) Filed: Jun. 10, 2005

(65) Prior Publication Data

US 2005/0284121 A1    Dec. 29, 2005

(30) Foreign Application Priority Data

| Jun. 25, 2004 | (JP) | ............................. 2004-188173 |
| Jun. 25, 2004 | (JP) | ............................. 2004-188216 |
| Jun. 25, 2004 | (JP) | ............................. 2004-188251 |
| Jun. 25, 2004 | (JP) | ............................. 2004-188310 |

(51) Int. Cl.
*A01D 43/00* (2006.01)
*A01D 43/06* (2006.01)

(52) U.S. Cl. ....................................................... 56/202
(58) Field of Classification Search ................. 56/202, 56/320.2, 16.6, 320.1, 203, 16.7, 17.5
See application file for complete search history.

(56) References Cited

U.S. PATENT DOCUMENTS

| 4,512,144 | A | * | 4/1985 | Soldavini | ........................ 56/202 |
| 4,566,257 | A | * | 1/1986 | Akrabawi | ........................ 56/202 |
| 4,631,909 | A | * | 12/1986 | McLane | ........................ 56/202 |
| 4,848,070 | A | * | 7/1989 | Berglund | ........................ 56/202 |
| 4,989,400 | A | * | 2/1991 | Wark | ........................ 56/202 |
| 5,010,716 | A | * | 4/1991 | Fassauer | ........................ 56/12.1 |
| 5,447,020 | A | * | 9/1995 | Dunn | ........................ 56/12.8 |
| 5,678,399 | A | * | 10/1997 | Baron | ........................ 56/320.2 |
| 6,105,350 | A | * | 8/2000 | Vachon et al. | ................ 56/202 |
| 6,705,068 | B2 | * | 3/2004 | Iida et al. | ..................... 56/202 |
| 2003/0066280 | A1 | * | 4/2003 | Iida et al. | ..................... 56/167 |

FOREIGN PATENT DOCUMENTS

| EP | 1300063 | | 4/2003 |
| GB | 2392076 | | 2/2004 |
| JP | 61125223 | | 8/1986 |
| JP | 06169624 | A * | 6/1994 |

* cited by examiner

*Primary Examiner*—Árpád Fábián Kovács
(74) *Attorney, Agent, or Firm*—Adams & Wilks

(57) ABSTRACT

A lawn mower has a machine body, a grass bag detachably attached to the machine body for collecting therein grass clippings, a driving power source mounted on the machine body, a cutter blade driven by the driving power source for rotation to cut grass, and a cutter housing covering the cutter blade. The cutter blade has air lifting sections disposed at opposite end portions thereof for producing carrier air during rotation of the cutter blade. The cutter housing has a grass clipping delivery passage for directing grass clippings to the grass bag with the carrier air produced by the air lifting sections of the cutter blade, and an exhaust air return passage for returning only the carrier air, as exhaust air, from the grass bag to the cutter housing. The grass clipping delivery passage extends in a front-and-rear direction of the cutter housing. The exhaust air return passage is disposed adjacent to and extends substantially perpendicular to the grass clipping delivery passage. The exhaust air return passage has an exhaust air inlet disposed in a rear upper surface portion of the cutter housing and an exhaust air outlet facing a rear lower end of the cutter housing.

11 Claims, 20 Drawing Sheets

LAWN MOWER EXHAUST AIR RETURN

FIELD OF THE INVENTION

The present invention relates to lawn mowers where grass clippings are delivered, with delivering or carrier air, from a cutter housing into a grass bag for collecting therein and the carrier air is then returned, as exhaust air, from the grass bag to the cutter housing.

BACKGROUND OF THE INVENTION

Lawn mowers have been known which cut grass, deliver the grass clippings, with carrier air produced by rotation of a cutter blade, from a grass clipping delivery passage into a grass bag and return only exhaust air from the grass bag to a cutter housing through an exhaust air return passage. In Japanese Utility Model Application Laid-open Publication No. SHO-61-125223, for example, there is disclosed a lawn mower which is constructed to return exhaust air from an upper rear portion of the grass bag to a central portion of the cutter housing in order to reduce unwanted sound and dust. The disclosed lawn mower will be described with reference to FIG. 21.

The lawn mower 300 shown in FIG. 21 is of an exhaust air circulation type, which includes a driving power source 302 disposed above the cutter housing (cutter deck) 301, a cutter blade 304 mounted on a shaft 303 of the driving power source 302, and a grass clipping delivery passage 305 provided in the cutter housing 301 for delivering grass clippings. Grass bag 307 for collecting therein grass clippings is attached to an outlet 306 of the grass clipping delivery passage 305, a return pipe 308 for returning exhaust air from the grass bag 307 to the cutter housing 301 extends from a rear upper portion of the grass bag 307, the distal end of the return pipe 308 is coupled to a middle portion of the cutter housing 301, and a fan 309 for drawing air from the return pipe 308 is fixed on the shaft 303 of the driving power source 302.

However, with the disclosed lawn mower 300, all of the carrier air can not be returned as exhaust air because the return pipe 308 for returning the exhaust air to the cutter housing 301 is very thin (and hence has a very small opening diameter or size). Thus, the lawn mower 300 can not achieve sufficient reduction in unwanted sound and dust by returning the carrier air, as exhaust air, from the grass bag 307 to the cutter housing 301. If the return pipe 308 for returning the exhaust air to the cutter housing 301 is made thicker (to have a greater opening diameter or size) in order to reduce unwanted sound and dust, then the overall weight of the lawn mower 300 would increase. Therefore, there is presently a demand for an improved lawn mower of the exhaust air return (circulation) type which can sufficiently reduce unwanted sound and dust and which can minimized an increase in weight inherent to the exhaust air circulation type.

Further, in U.S. Pat. No. 4,631,909, for example, there is disclosed another law mower which is constructed to reduce unwanted sound and dust by returning exhaust air from the grass bag to an upper portion of the cutter housing. The disclosed lawn mower will be discussed below with reference to FIG. 22.

The lawn mower 320 shown in FIG. 22 is of the exhaust air return (circulation) type, in which the cutter blade 322 is rotatably provided within the cutter housing 321 and the grass clipping delivery passage 323 for delivering grass clippings is provided in the cutter housing 321 along with an exhaust air return passage 324. Grass bag 327 is provided in communication with an outlet 325 of the grass clipping delivery passage 323 and inlet 326 of the exhaust air return passage 324. In this lawn mower 320, in order to separate the grass clippings and carrier air from each other, the grass bag 327 is formed of an air-permeable material, so that a portion of the carrier air is discharged out of the grass bag 327 while the remaining portion of the carrier air is returned to the cutter housing 321. Because of such a construction, the lawn mower 320 can not attain sufficient reduction in unwanted sound and dust. Therefore, it is necessary to reduce unwanted sound and dust more effectively for an improved working environment.

In some cases, the lawn mowing operation is performed with grass clippings left on a ground surface without being collected into the grass bag; such lawn mowing operation will be called "just-cutting lawn mowing operation". However, in the operating state where the grass bag 327 is detached from the cutter housing 321 in the lawn mower 320 shown in FIG. 22, the exhaust air return passage 324 is left opened during the operation, which would disadvantageously make it difficult to secure necessary flows of the carrier air. Therefore, there is a demand for a lawn mower of enhanced convenience which can appropriately perform just-cutting lawn mowing operation.

SUMMARY OF THE INVENTION

According to an embodiment of the present invention, there is provided an improved lawn mower including a grass bag detachably attached to a machine body of the lawn mower for collecting therein grass clippings, which comprises: a cutter blade rotatable by a driving power source not only to cut grass, but also to produce carrier air by means of air lifting sections provided at opposite end portions thereof; and a cutter housing covering the cutter blade, the cutter housing having a grass clipping delivery passage for directing grass clippings to the grass bag with the carrier air, and an exhaust air return passage for returning only the carrier air, as exhaust air, from the grass bag to the cutter housing. The grass clipping delivery passage is provided to extend in a front-and-rear direction of the cutter housing, the exhaust air return passage is provided adjacent to the grass clipping delivery passage and extends substantially perpendicularly to the grass clipping delivery passage, the exhaust air return passage has an exhaust air inlet provided in a rear upper surface portion of the cutter housing, and the exhaust air return passage has an exhaust air outlet facing a rear lower end of the cutter housing.

For example, if the exhaust air is discharged directly out of the grass bag, unwanted sound and dust would be produced from a rear portion of the machine body. If such unwanted sound and dust can be reduced in some way or other, it will be very preferable in that a good working environment can be maintained. Also, if the weight of the lawn mower can be reduced, it will be very advantageous in that the overall weight of the machine body can be reduced and thus the lawn mower can be carried with an increased ease.

For these purposes, the exhaust air return passage in the present invention is positioned adjacent to the grass clipping delivery passage and extends substantially perpendicularly to the grass clipping delivery passage, the exhaust air inlet of the exhaust air return passage is provided in the rear upper surface of the cutter housing, and the exhaust air outlet of the exhaust air return passage is positioned to face the rear lower end of the cutter housing. Namely, with the exhaust air return passage positioned adjacent to and extending substantially perpendicularly to the grass clipping delivery passage, the sectional area of the passage can be increased as compared to the case where the exhaust air return passage is provided in a rear portion or side portion of the machine body.

With the exhaust air inlet of the exhaust air return passage provided in the rear upper surface of the cutter housing, the exhaust air can be directed from the upper surface of the grass bag to the exhaust air return passage. Because there is generally provided a space over the upper surface of the grass bag, a great amount of the exhaust air can flow to the exhaust air return passage. Namely, the present invention allows all of the carrier air, flowing from the cutter housing to the grass bag, to be returned as exhaust air, there by avoiding a need for discharging the exhaust air from the grass bag.

Generally, a lawn surface located at the rear of the cutter housing, where grass has just been cut by the cutter blade, is lower than other lawn surfaces located in front of and to the left and right of the cutter housing where grass has not been cut by the cutter blade. Further, the interior of the cutter housing is placed under a negative pressure due to production of the carrier air by the air lifting sections of the cutter blade. Thus, with the exhaust air outlet of the exhaust air return passage facing the rear lower end of the cutter housing, the exhaust air discharged from the exhaust air return passage can be readily sucked into the cutter housing. In this way, the present invention can significantly reduce the necessary length of the exhaust air return passage and hence the overall weight of the lawn mower, thereby enhancing the convenience, such as the portability, of the lawn mower.

Preferably, the cutter housing has a plurality of auxiliary exhaust air return passages formed in a rear wall thereof for returning the exhaust air from the grass bag into the cutter housing. Thus, even when there has arisen a situation where the exhaust air can not be easily returned via the (main) exhaust air return passage, the exhaust air can be returned to the cutter housing through the auxiliary exhaust air return passages in addition to or in place of the main exhaust air return passage. As a consequence, the exhaust air returning circulation in the lawn mower can be promoted with an enhanced reliability.

The grass bag is substantially in the shape of a rectangular parallelepiped and has: an opening portion formed in a front region thereof and communicating with the grass clipping delivery passage; left and right side walls and bottom section that are formed of a non-air-permeable material; a netted member formed of an air-permeable material and disposed on an upper portion thereof; a cover member formed of a non-air-permeable material and covering an upper surface portion of the netted member; and an exhaust air conducting passage disposed between the netted member and the cover member in communication with the exhaust air return passage and having a closable rear portion. Thus, grass clippings can be appropriately collected in the grass bag without the exhaust air leaking through the left and right side walls, rear wall and bottom section. In this way, the grass clippings and the carrier air are separated from each other via the netted member disposed on the upper portion of the grass bag, and the thus-separated carrier or exhaust air is discharged to the exhaust air conducting passage, defined between the netted member and a non-air-permeable cover member disposed immediately above the netted member, so that it is directed to the exhaust air return passage via the exhaust air conducting passage.

Preferably, the grass bag includes an inner member generally in the shape of a rectangular parallelepiped and an expandable outer member covering an outer peripheral surface of the inner member. The inner member preferably has: an upper portion, left and right side walls and rear wall that are formed of an air-permeable material; a bottom section formed of a non-air-permeable material; and an inner opening portion formed in a front region thereof in communication with the grass clipping delivery passage. The outer member is formed of a non-air-permeable material and covers outer peripheral surfaces of the upper portion, left and right side walls and rear wall with a space interposed between the outer member and the outer peripheral surfaces, and the outer member has an outer opening portion formed near the inner member in communication with the exhaust air return passage.

Preferably, the bottom section of the inner member is formed integrally with and of the same material as the upper portion, left and right side walls and rear wall of the inner member, and the bottom member is covered with the outer member formed of the non-air-permeable material so as to provide a non-air-permeable bottom of the grass bag. Thus, the inner member may be formed of a cloth, in which case the weight of the grass bag can be significantly reduced.

In a preferred embodiment, the lawn mower further comprises a discharge guard, pivotably mounted to the exhaust air inlet, 1) for, during normal lawn mowing operation with the grass bag attached to the machine body, covering a part of the grass bag to direct the exhaust air from the grass bag to the exhaust air return passage, and 2) for, during "just-cutting" lawn mowing operation with the grass bag detached from the machine body so that grass clippings are discarded onto a ground surface, closing the exhaust air inlet to direct the grass clippings onto the ground surface.

During the normal lawn mowing operation where the exhaust air is returned from the grass bag to the cutter housing, the discharge guard functions as a passage member for directing the exhaust air from the grass bag to the exhaust air return passage. During "just-cutting" lawn mowing operation where grass clippings are discharged to the ground surface with the grass bag detached from the machine body, the discharge guard functions as a lid for closing the exhaust air inlet of the exhaust air return passage. In the above-described manner, the lawn mower of the present invention can also be used appropriately in the "just-cutting" lawn mowing operation where grass clippings are discharged to the ground surface without being collected in the grass bag, even though it is of the exhaust-air-returning type where the exhaust air is returned from the grass bag to the cutter housing. Thus, the present invention can appropriately deal with needs for a variety of different lawn mowing operation and can achieve an enhanced convenience of the lawn mower.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
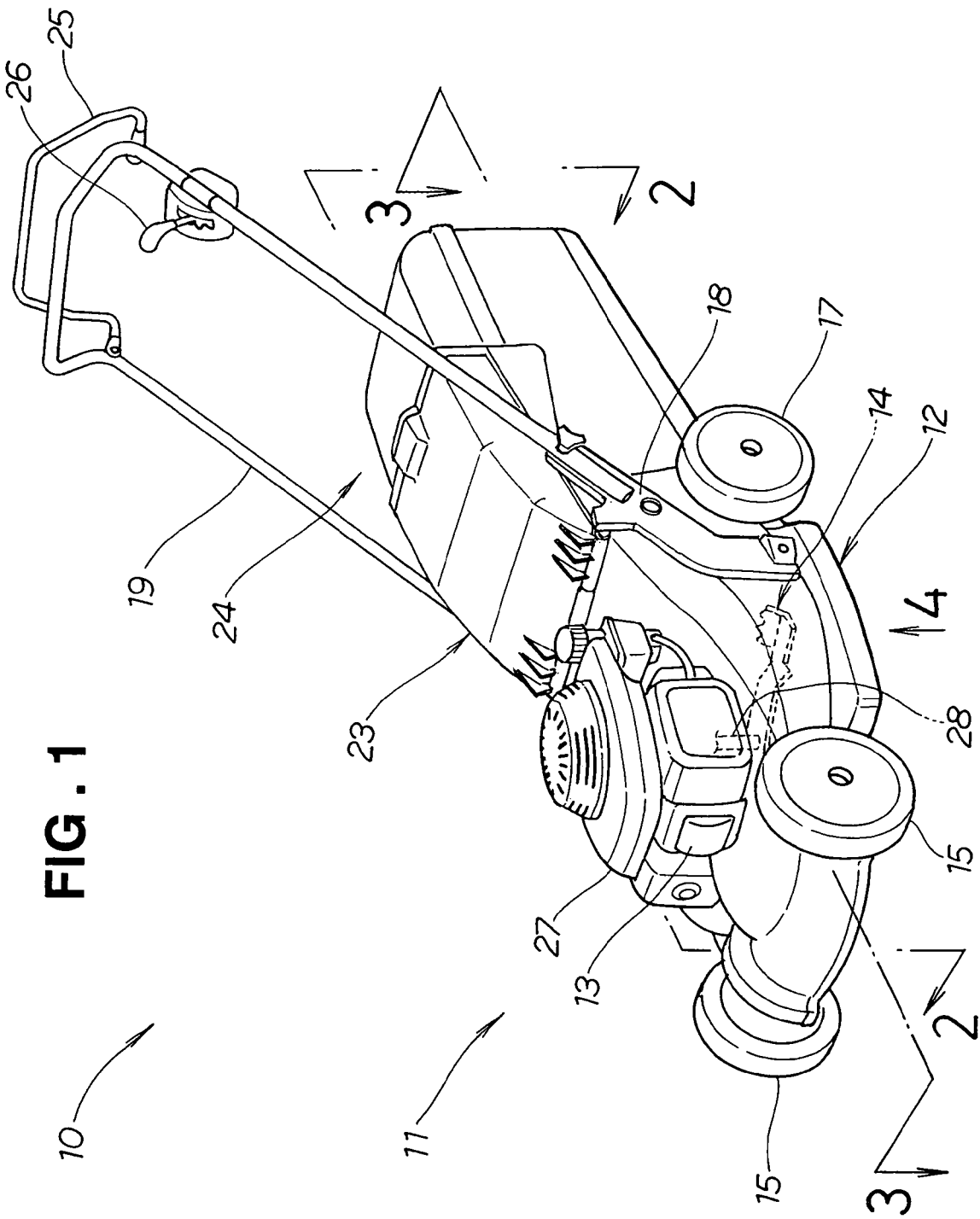
FIG. 1 is a perspective view of a lawn mower according to a first embodiment of the present invention.

FIGS. 1-11B show a lawn mower according to a first embodiment of the present invention. The first embodiment of the lawn mower 10 is of the so-called exhaust air return (or circulation) type, where grass clippings are delivered, with carrier air, from a cutter housing (cutter deck) 12 to a grass bag 24 for collecting therein and the carrier air is then returned, as exhaust air, from the grass bag 24 to the cutter housing 12.

The lawn mower 10 is also of the self-propelled type, where a cutter blade 14 is rotated, by an engine 13 as a driving power source, to cut grass and simultaneously the rotation of the engine 13 is transmitted to rear wheels 17 to drive the rear wheels 17 by the engine 13. Details of the lawn mower 10 will be discussed hereinbelow.

In FIG. 1, reference numeral 11 represents a machine body, 15 a front wheel (two front wheels in the illustrated example), 23 a discharge guard (grass cover), 25 a cutter lever, 26 a speed change (or shift) lever, 27 a head cover, and 28 a rotation shaft of the cutter blade 14.

Figure 2:
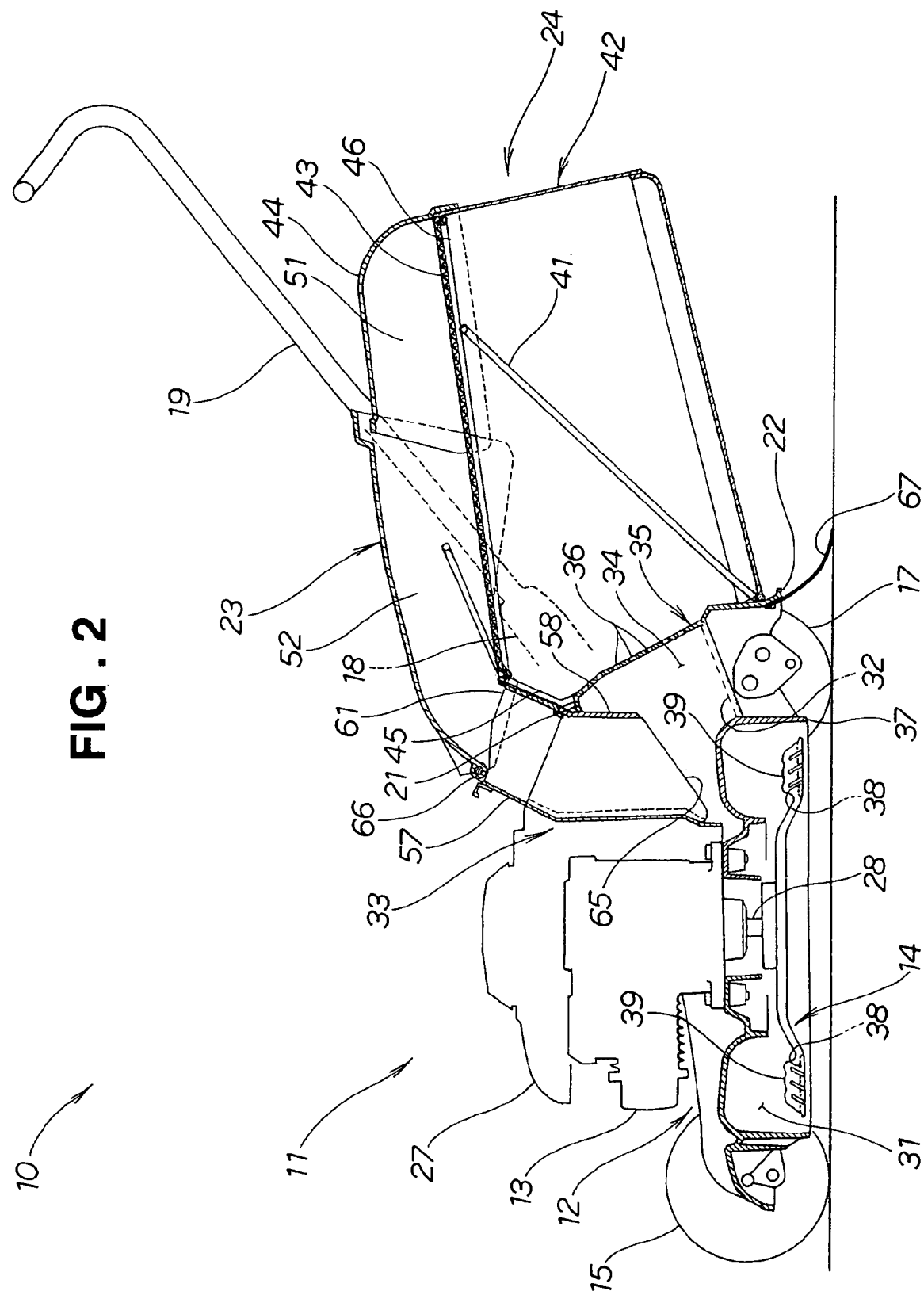
FIG. 2 is a sectional side view of the lawn mower taken along the 2-2 line of FIG. 1.

FIG. 2 is a sectional side view of the lawn mower 10 taken along the 2-2 line of FIG. 1, in which illustration of the cutter lever 25 and speed change lever 26 is omitted.

The cutter housing 12 includes a scroll section 31 surrounding the cutter blade 14 in such a way as to permit rotation of the cutter blade 14, a grass clipping delivery passage 32 extending rearwardly from the scroll section 31 to deliver grass clippings to the grass bag 24 along with carrier air, and an exhaust air return passage 33 for returning only exhaust air to the cutter housing 12 with only the grass clippings left in the grass bag 24. The scroll section 31 is an enclosure for delivering, to the grass bag 24, grass cut by the cutter blade 14. The cutter housing 12 also has a cavity section 34 communicating with the exhaust air return passage 33, and a plurality of through-holes 36 formed, as auxiliary exhaust air passages, in a wall portion of rear wall 35 of the cutter housing 12, for subsidiarily returning the exhaust air to the cutter housing 12.

Reference numeral 21 represents a rear upper surface of the cutter housing 12, 22 a rear lower end of the cutter housing 12, and 37 a rear edge of the scroll section 31.

The grass clipping delivery passage 32 is a passageway that is formed in one side of the housing 12 and extends from the scroll section 31 toward the rear of the machine body 11. The exhaust air return passage 33 is a passageway that is formed adjacent to the grass clipping delivery passage 32 and extends substantially perpendicularly to the grass clipping delivery passage 32.

Reference numeral 42 represents a grass clipping collecting section of the grass bag 24, and 51 represents an exhaust air conducting passage defined by a cover member 44 and an upper rear surface portion of a netted member 43 of the grass bag 24. Further, reference numeral 52 represents a connection passage defined by the discharge guard 23 and an upper front surface portion of the netted member 43 of the grass bag 24, and this connection passage 52 is provided to function as an extension of the exhaust air return passage 33.

The lawn mower 10 also includes an exhaust guard (partition member) 67 that is provided, on the rear lower end 22 of the cutter housing 12 beneath the rear end 35, for preventing escape of exhaust air and directing the exhaust air toward cutter housing 12. The provision of the exhaust guard 67 on the rear lower end 22 of the cutter housing 12 achieves an enhanced exhaust air circulation (i.e., exhaust air return) efficiency. As a result, the lawn mower 10 can achieve sufficient reduction in unwanted sound and dust, thereby accomplishing maintenance of a good working environment.

Figure 3:
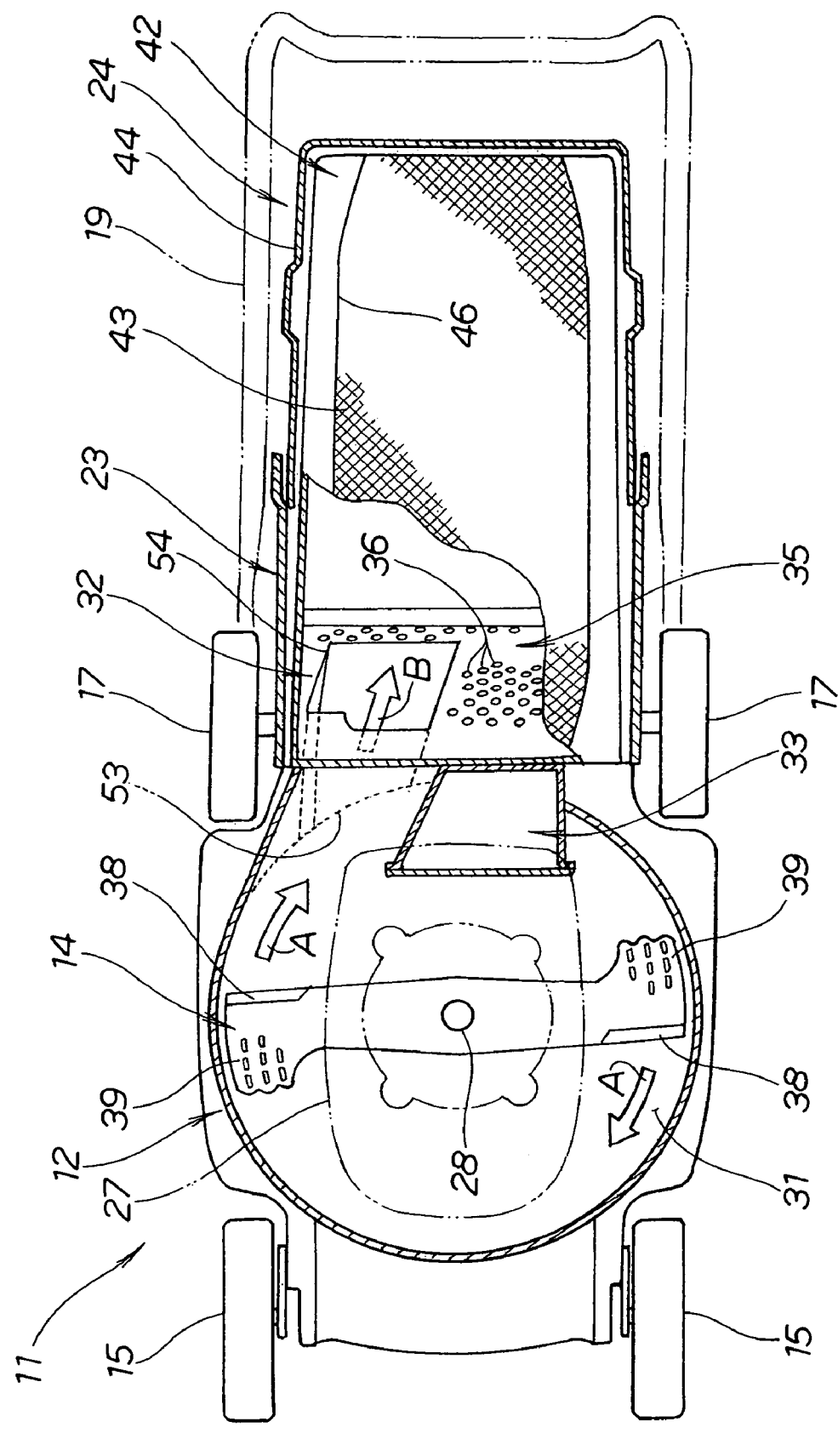
FIG. 3 is a sectional plan view of the lawn mower taken along the 3-3 line of FIG. 1.

As illustrated in FIG. 3, the cutter blade 14, which is rotatable in a direction indicated by arrow A, has a pair of cutting edges 38 at its edge portions leading the rotation, and a pair of air lifting sections 39 arcuately curved upwardly from the cutting edges 38 to its other edge portions trailing in the rotation.

Namely, grass on a ground surface is caused to stand up by a negative pressure produced under the air lifting sections 39 through the rotation of the cutter blade 14, and the grass cut by the cutting edges 38 i.e., grass clippings) hits the upper surface of the air lifting sections 39 and rides on swirling flows produced by the rotation of the cutter blade

14. Thus, the grass clippings are delivered, with the swirling flows as carrier air, to the grass bag 24 as indicated by arrow B.

Figure 4:
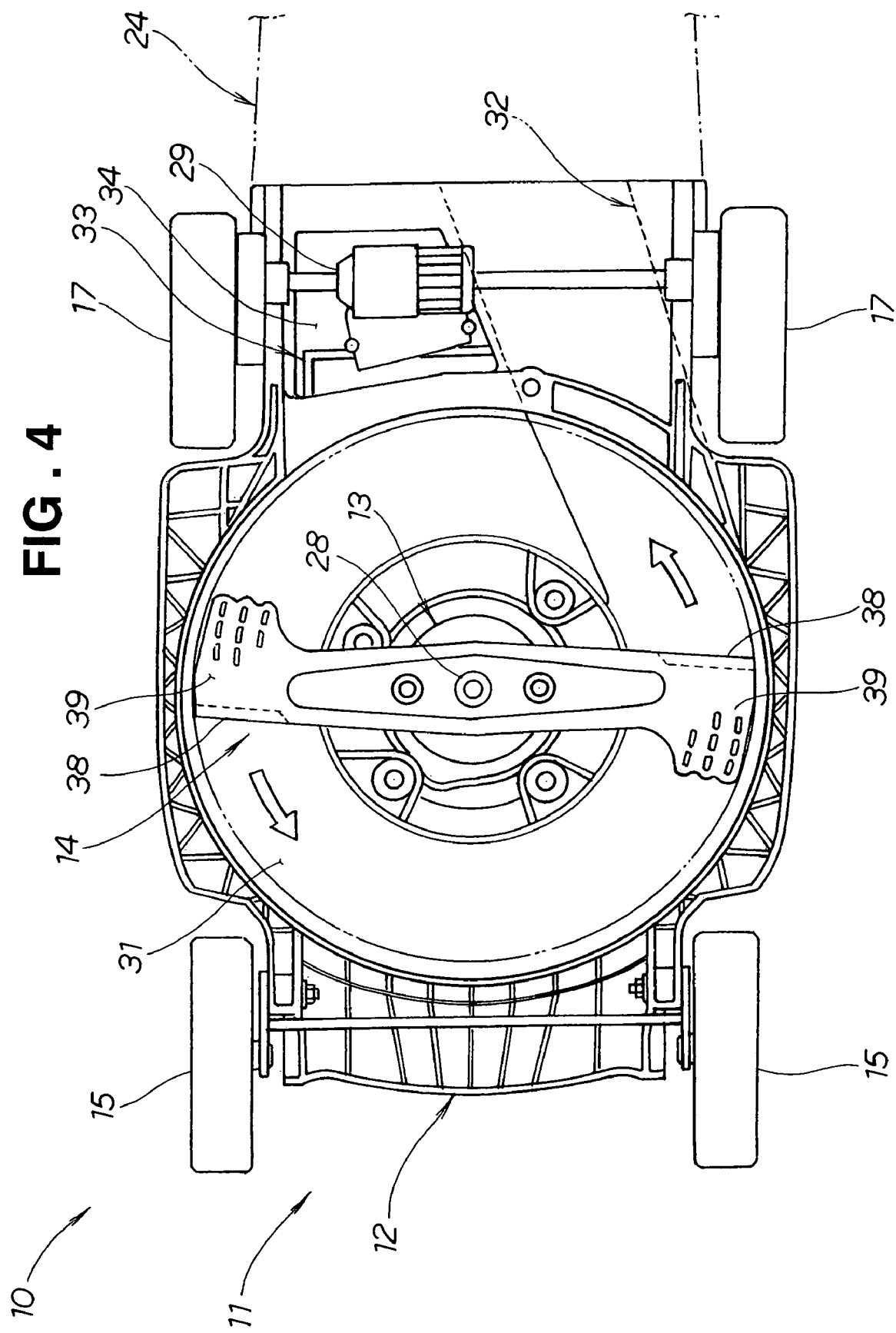
FIG. 4 is a view of the lawn mower taken in a direction of arrow 4 of FIG. 1.

As seen from FIG. 4, the lawn mower 10 is an exhaust-air-circulation type lawn mower. Here, the cutter blade 14, covered by the cutter housing 12, is rotated by the engine (driving power source) 13, the grass clipping delivery passage 32 for delivering grass clippings to the grass bag 24 and the exhaust air return passage 33 for returning exhaust air to the cutter housing 12 are provided in the cutter housing 12, the grass bag 24 for collecting grass clippings is provided in communication with both the grass clipping delivery passage 32 and the exhaust air return passage 33, grass clippings are delivered, with the air produced via the air lifting sections 39 of the cutter blade 14, to the grass bag 24 through the grass clipping delivery passage 32, and only the exhaust air is returned from the grass bag 24 to the cutter housing 12 through the exhaust air return passage 33.

Reference numeral 29 represents a power transmission member for transmitting driving power from the engine 13 to the rear wheels 17.

Figure 5:
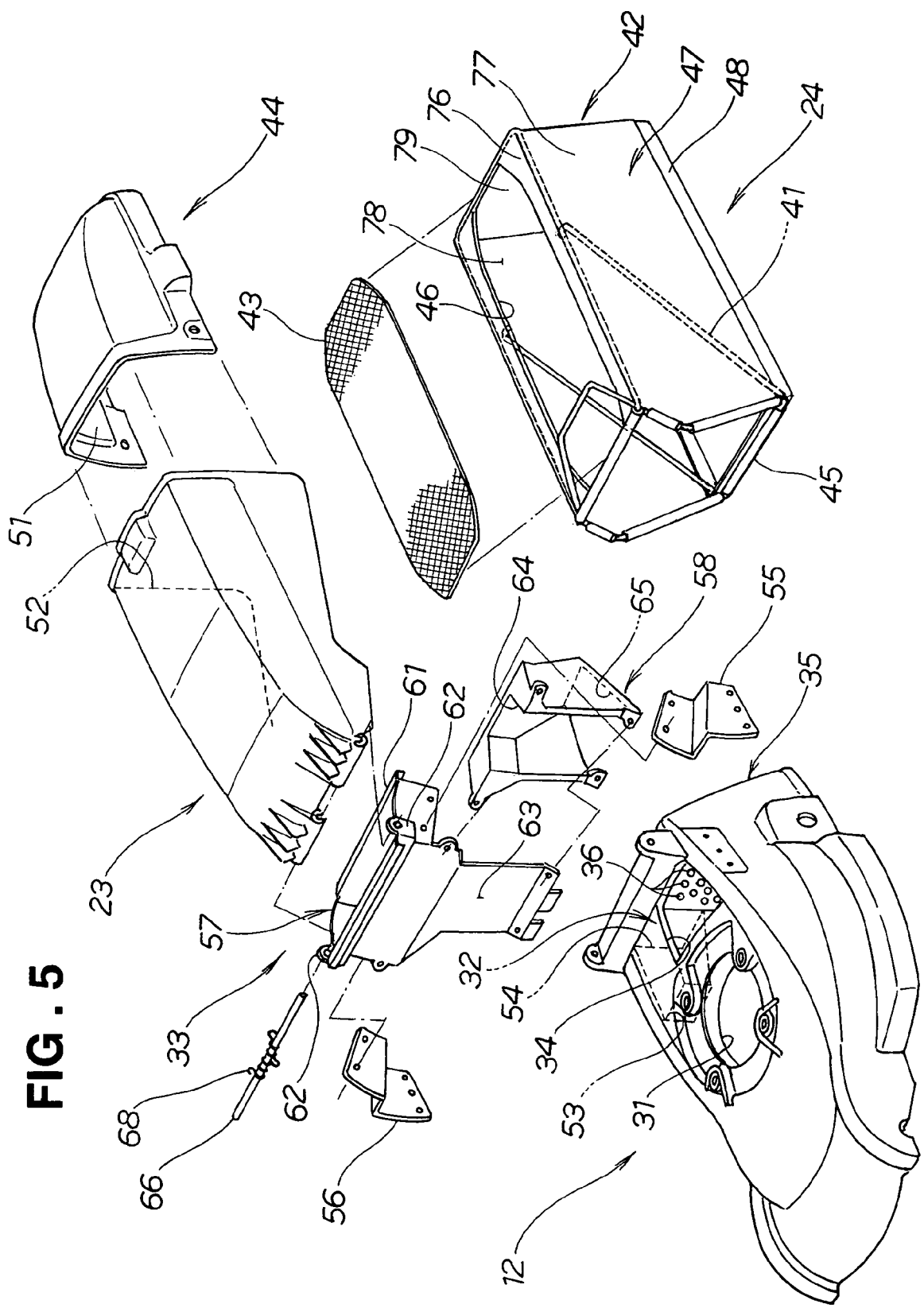
FIG. 5 is an exploded perspective view of a cutter housing, discharge guard and grass bag of FIG. 1.

The following paragraphs describe in detail the construction of the discharge guard 23 (see FIG. 2), grass bag 24, grass clipping delivery passage 32 and exhaust air return passage 33. FIG. 5 is an exploded perspective view showing principal component parts of the grass clipping delivery passage 32 and exhaust air return passage 33 in the first embodiment of the lawn mower.

The discharge guard 23 is disposed on the rear upper surface 21 (see FIG. 2) and secured via a shaft 60 to an exhaust air inlet 61 of the exhaust air return passage 33 in such a manner that it is openable and closable as desired. More specifically, the discharge guard 23 is a cover of a "U" sectional shape positioned over the exhaust air inlet 61 of the exhaust air return passage 33. When the grass bag 24 is attached to the cutter housing 12, the discharge guard 23 functions as a connection passage (i.e., connection passage 52 to be later described) for directing exhaust air from the grass bag 24 to the exhaust air return passage 33, while, when the grass bag 24 is not attached to the cutter housing 12, it functions as a lid for closing the exhaust air inlet 61 of the exhaust air return passage 33.

Return spring 68 is attached to the shaft 66 between the exhaust air return passage 33 and the discharge guard 23, so as to normally bias the discharge guard 23 in such a direction as to close the exhaust the air inlet 61 of the exhaust air return passage 33. In this way, the spring 68 prevents shaky movement of the discharge guard 23.

Because the grass bag 24 is simply hooked to a rear end surface of the cutter housing 12, the return spring 68 also functions to make more reliable the connection of the grass bag 24 to the cutter housing 12, i.e. performs functions for preventing bumpy movement and accidental detachment of the grass bag 24.

As will be later detailed, the carrier air directly hits the discharge guard 23 during lawn mowing operation where grass clippings are left on the ground surface with no grass bag 24 attached to the lawn mower 10 (see FIG. 11B). Namely, without the return spring 68, the discharge guard 23 may be undesirably lifted or vibrated by the carrier air; thus, the return spring 68 can be said to be a spring indispensable for pressing the discharge guard 23 toward the cutter housing 12.

The grass bag 24, which is substantially in the shape of a rectangular parallelepiped, is detachably attached to the rear wall 35 of the cutter housing 12. The grass bag 24 has a frame member 41 attachable to the cutter housing 12, the above-mentioned grass clipping collecting section 42 formed of a non-air-permeable material and attached to the frame member 41 for collecting therein grass clippings, the above-mentioned netted member 43 formed of an air-permeable material and disposed on the upper surface of the grass clipping collecting section 42, and the above-mentioned cover member 44 of a non-air-permeable material disposed to define a space immediately above the netted member 43 and having an open front end and closed rear end.

For example, the cutter housing 12 may have an engaging portion for engagement with a hook portion of the grass bag 24 so that the grass bag 24 can be detachably attached to the cutter housing 12.

The grass clipping collecting section 42 has a body member 47 with an upper surface portion 76, left and right side surface portions 77, 78 and rear surface portion 79 that are in the form of moldings, sheets or films of a non-air-permeable material, such as resin or plastics. The grass clipping collecting section 42 also has a bottom member 48 molded of resin, an opening portion 45 abutted against the rear wall 35 of the cutter housing 12 in such a manner that it communicated with the grass clipping delivery passage 32, and an upper opening portion 46 for mounting thereon the netted member 43.

Namely, the grass clipping collecting section 42 separates the grass clippings and carrier air by causing the carrier air to escape as exhaust air upwardly through the netted member 43 with the grass clippings accumulated on the bottom member 48.

The cover member 44 covers a rear region of the upper opening portion 46 of the grass clipping collecting section 42 to thereby define, together with the netted member 43, the exhaust air conducting passage 51 for directing exhaust air to the exhaust air return passage 33. The discharge guard 23 covers a front region of the upper opening portion 46 to thereby define, in conjunction with the netted member 43, the connection passage 52 for directing exhaust air from the exhaust air conducting passage 51 to the exhaust air return passage 33.

Because the left and right side surface portions 77, 78, rear surface 79 and bottom member 48 of the grass clipping collecting section 42 are formed of a non-air-permeable material, exhaust air can be prevented from flowing to the outside through the left and right side surface portions 77, 78, rear surface 79 and bottom member 48 of the rectangular parallelepiped. As a result, unwanted sound and dust discharged along with the exhaust air can be effectively reduced as compared to the case where exhaust air is thereby discharged from the grass bag 24.

Further, because the non-air-permeable cover member 44 is disposed over the netted member 43, the exhaust air conducting passage 51 can be formed to have a sufficient passage area for directing all of the exhaust air to the exhaust air return passage 33.

The grass clipping delivery passage 32, which, as set forth above, is a passageway that is formed in one side (left or right side) of the machine body 11 and extending from the scroll section 31 toward the rear of the machine body 11 (see FIG. 2), has a carrier air inlet 53 formed in the scroll section 31 and a carrier air outlet 54 formed in the rear wall 35.

Further, the exhaust air return passage 33 is a passageway that is formed adjacent to the grass clipping delivery passage 32 and extends substantially perpendicularly to the grass clipping delivery passage 32 and that communicates with the cavity section 34 of the cutter housing 12. The exhaust air return passage 33 includes a passage body section 57 for attachment via left and right brackets 55 and 56 to a rear upper surface of the cutter housing 12, and an auxiliary member 58 joined to the passage body section 57 to define a cylindrical passage.

The passage body section 57 has the exhaust air inlet 61 for drawing exhaust air, support portions 62 for rotatably supporting the discharge guard 23 via the shaft 66, and a support wall 63 to which the auxiliary member 58 is secured.

The auxiliary member 58 has an opening 64 for narrowing the exhaust air inlet 61 to restrict flows of exhaust air, and an exhaust air outlet 65 for discharging exhaust air to the cavity section 34.

Because the exhaust air return passage 33 in the instant embodiment comprises the passage body section 57 and auxiliary member 58 joined to the passage body section 57 to define a cylindrical passage, it is possible to set as desired a shape of the exhaust air return passage 33 and thus increase the design freedom of the exhaust air return passage 33.

Figure 6:
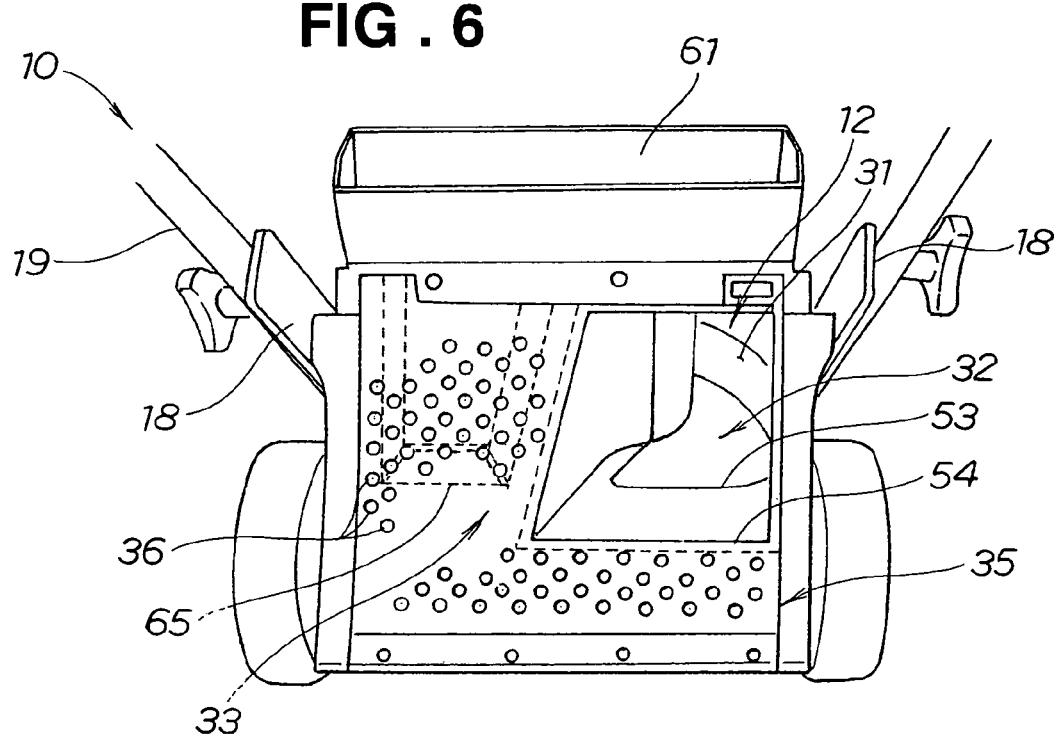
FIG. 6 is a view showing a grass clipping passage provided in the lawn mower of FIG. 1.

As seen in FIG. 6, the grass clipping delivery passage 32 is provided in the cutter housing 12 to extend in the front-and-rear direction of the lawn mower. The exhaust air return passage 33 is formed adjacent to the grass clipping delivery passage 32 and extends substantially perpendicularly to the grass clipping delivery passage 32, and the grass clipping delivery passage 32 is formed in a right rear portion of the cutter housing 12. Further, the plurality of through-holes 36 are formed in the rear wall 35 of the cutter housing 12.

Figure 7:
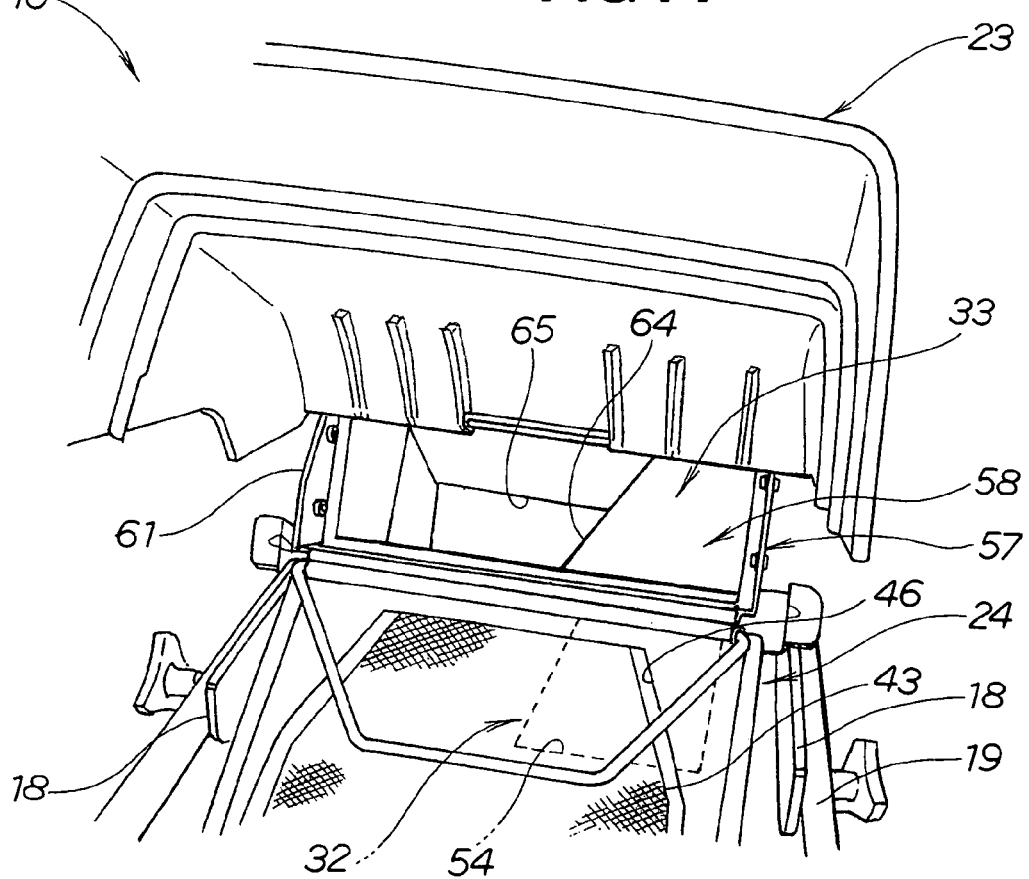
FIG. 7 is a view showing an exhaust air return passage shown in FIG. 2.

As illustrated in FIG. 7, the discharge guard 23 is pivotably mounted to the exhaust air inlet 61 of the exhaust air return passage 33. By causing the discharge guard 23 to pivot upwardly away from the exhaust air inlet 61, the netted member 43 and upper opening portion 46 of the grass clipping collecting section 42 (se FIG. 2) of the grass bag 24 are exposed, and thus, the exhaust air inlet 61 of the exhaust air return passage 33 and the exhaust air restricting opening 64 of the auxiliary member 58 are also exposed. The discharge guard 23, mounted on the front region of the upper opening portion 46 of the grass clipping collecting section 42, defines, in conjunction with the netted member 43, the connection passage 52 (see FIG. 2) for directing exhaust air from the exhaust air conducting passage 51 to the exhaust air passage 33.

Figure 8:
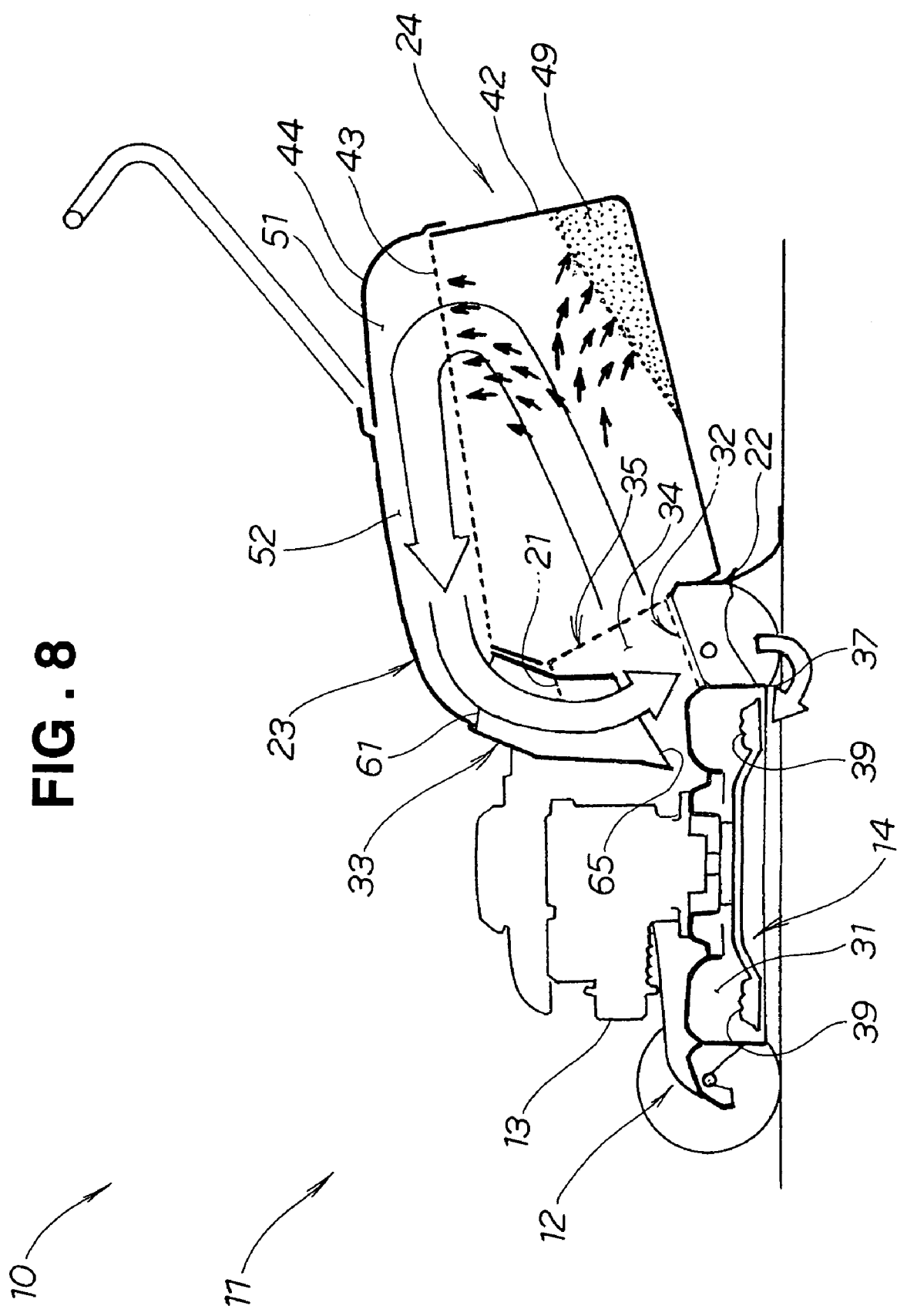
FIG. 8 is a schematic side view showing flows of carrier air, grass clippings and exhaust air in the lawn mower during lawn mowing operation.

FIG. 8 is a view showing flows of grass clippings and exhaust air in the lawn mower 10 during normal lawn mowing operation.

Grass cut by the cutter blade 14 (i.e., grass clippings 49) is delivered, with carrier air, from the grass clipping delivery passage 32 to the grass bag 24 and collected in the grass bag 24. The carrier air is then directed as exhaust air into the exhaust air conducting passage 51 through the netted member 43. Further, the exhaust air flows from the exhaust air conducting passage 51, via the connection passage 52, into the exhaust air return passage 33, from which it is discharged to the cavity section 34 of the cutter housing (cutter deck) 12. The exhaust air thus discharged to the cavity section 34 is sucked into and flows backward in the scroll section 31 of the cutter housing 12 by the negative pressure produced by the scroll section 31.

Namely, the grass clipping delivery passage 32 is provided to extend in the front-and-rear direction within the cutter housing 12, and the exhaust air return passage 33 is provided adjacent to the grass clipping delivery passage 32 and extends substantially perpendicularly to the grass clipping delivery passage 32. Further, the exhaust air inlet 61 of the exhaust air return passage 33 is located in the rear upper surface 21 of the cutter housing 12, and the exhaust air outlet 65 of the exhaust air return passage 33 faces the rear lower end 22 of the cutter housing 12 (more specifically, the passage 33 faces a rear edge 37 of the scroll section 31 of the cutter housing 12).

In the above-described first embodiment of the present invention where the exhaust air return passage 33 is provided adjacent to the grass clipping delivery passage 32 and extends substantially perpendicularly to the grass clipping delivery passage 32, the sectional area of the exhaust air return passage 33 can be increased without the overall volume of the machine body 11 having to be increased, as compared to the case where the exhaust air return passage 33 is disposed in a rear or side portion of the machine body 11, As a consequence, the embodiment of the present invention can achieve sufficient reduction in unwanted sound and dust without increasing the volume of the machine body 11.

Further, with the exhaust air inlet 61 of the exhaust air return passage 33 located above the rear upper surface 21 of the cutter housing 12, exhaust air can be caused to appropriately flow from the upper surface of the grass bag 24 into the exhaust air return passage 33.

Furthermore, because there is provided a space immediately above the upper surface of the grass bag 24, a great amount of exhaust air can be returned to the exhaust air return passage 33 through the space. Namely, because all of the carrier air flowing from the cutter housing 12 to the grass bag 24 can be returned as exhaust air, the embodiment of the present invention can avoid a need for discharging exhaust air from the grass bag 24. As a consequence, the embodiment can achieve sufficient reduction in unwanted sound and dust, thereby accomplishing maintenance of a good working environment.

Lawn surface at the rear of the cutter housing, where grass has already been cut by the cutter blade 14, is lower than other lawn surfaces located in front of and to the left and right of the rear portion of the cutter housing where grass has been cut by the cutter blade 14. Further, the interior of the cutter housing is placed under a negative pressure due to production of carrier air by the air lifting sections of the cutter blade 14. Thus, because the exhaust air outlet 65 of the exhaust air return passage 33 is opposed to the rear lower end 22 of the cutter housing 12, exhaust air discharged from the exhaust air return passage 33 can be readily sucked into the scroll section 31 of the cutter housing 12. Therefore, the instant embodiment can reduce the necessary length of the exhaust air return passage 33 and hence the overall weight of the lawn mower 10, thereby enhancing the convenience, such as the portability, of the lawn mower 10.

The embodiment of the lawn mower 10 is constructed in such a manner that carrier air and grass clippings 49 are delivered, via the grass clipping delivery passage 32 extending rearward and upward from the scroll section 31, to the grass bag 24 mounted to extend obliquely upwardly toward the rear of the lawn mower 10. The grass clippings 49 are heavier than the carrier air, and thus, only the carrier air can be caused to flow upward with the grass clippings 49 falling onto the bottom member 48 of the grass clipping collecting section 42 (see FIG. 5).

Further, with the air-permeable netted member 43 disposed on the upper surface of the grass clipping collecting section 42, the instant embodiment can readily separate the carrier air and grass clippings 49. The grass clippings 49 sticking to the netted member 43 with the carrier air can readily fall into the grass clipping collecting section 42 by its own weight as the cutter blade 14 stops rotating.

Namely, because the left and right side surface portions 77, 78 and rear surface portion 79 of the grass clipping collecting section 42 are in the form of moldings, sheets or films of a non-air-permeable material, such as resin or plastics, the grass clippings 49 will not stick to the left and right side surface portions 77, 78 and rear surface portion 79 of the grass clipping collecting section 42, or if any of them sticks to the surface portions 77, 78 and 79, it can readily fall off.

Figure 9A:
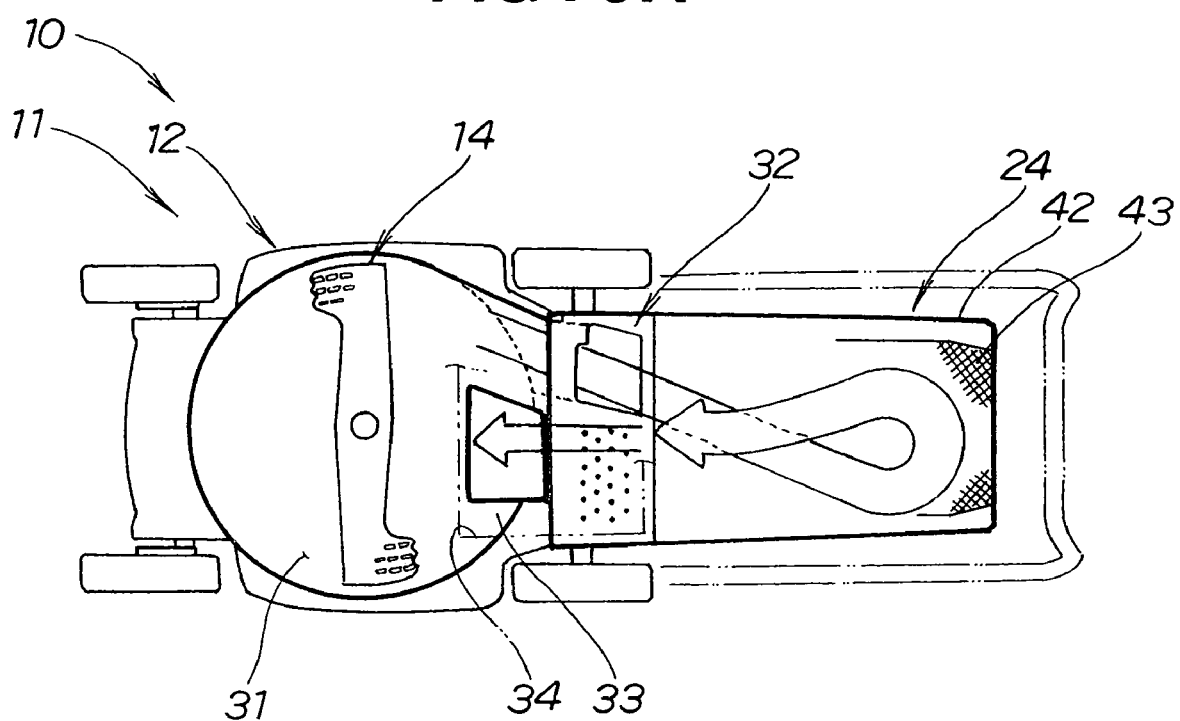
FIGS. 9A and 9B are schematic plan views showing flows of the carrier air, grass clippings and exhaust air during the lawn mowing operation.
Figure 9B:
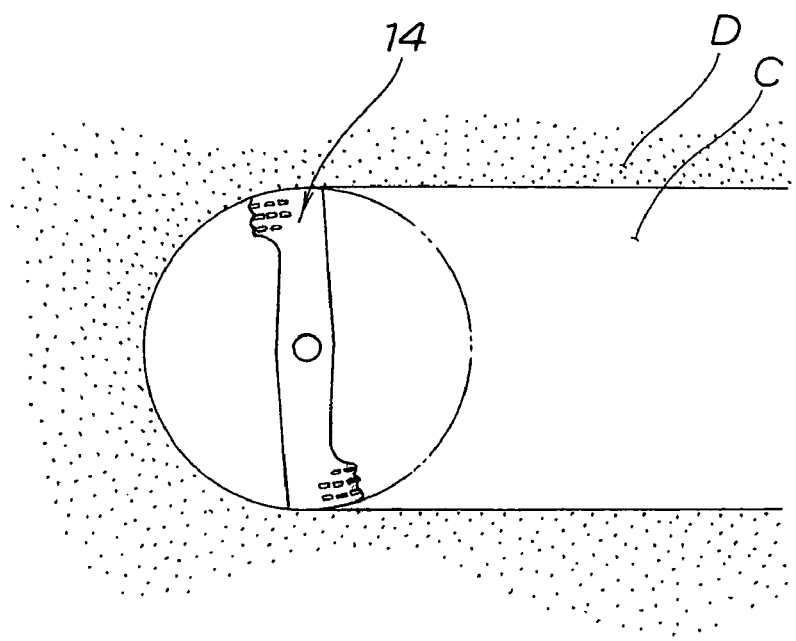

FIGS. 9A and 9B are plan views showing flows of carrier air, grass clippings and exhaust air in the first embodiment of the lawn mower 10.

In FIG. 9A, grass is first cut by the cutter blade 14, and then the resultant grass clippings are delivered, with carrier air, to the grass clipping collecting section 42 of the grass bag 24 for collection therein. The carrier air is directed as exhaust air through the netted member 43 to the exhaust air conducting passage 51 (see FIG. 8), from which the exhaust air is directed via the connection passage 52 to the exhaust air return passage 33. Then, the exhaust air is directed from the exhaust air return passage 33 into the cavity section 34, from which the exhaust air is sucked into the scroll section 31 producing a negative pressure.

In FIG. 9B, a white (or non-dotted) area C indicates a lawn surface where grass has been cut by the cutter blade 14, while a dotted area D indicates a lawn surface where grass has not been cut by the cutter blade 14. The lawn surface indicated by the dotted area D (i.e., "not-yet-cut lawn surface") is higher in level than the already-cut lawn surface indicated by the non-dotted area C. Therefore, during the lawn mowing operation, it can be considered as if the front and left and right side surfaces of the cutter housing 12 of FIG. 9A were surrounded by a wall of the dotted area D and an opening indicated by the non-dotted area C were present behind the rear surface of the cutter housing 12.

Namely, it can be said that, with the exhaust air outlet 65 of the exhaust air return passage 33 facing the rear lower end 22 of the cutter housing 12, the exhaust air sucking-in action by the negative pressure of the scroll section 31 can be effected with an increased ease as compared to the case where the exhaust air outlet 65 of the exhaust air return passage 33 faces another portion (e.g., front or left or right side surface of the cutter housing 12). As a consequence, the exhaust air circulation can be carried out with an enhanced efficiency.

Figure 10:
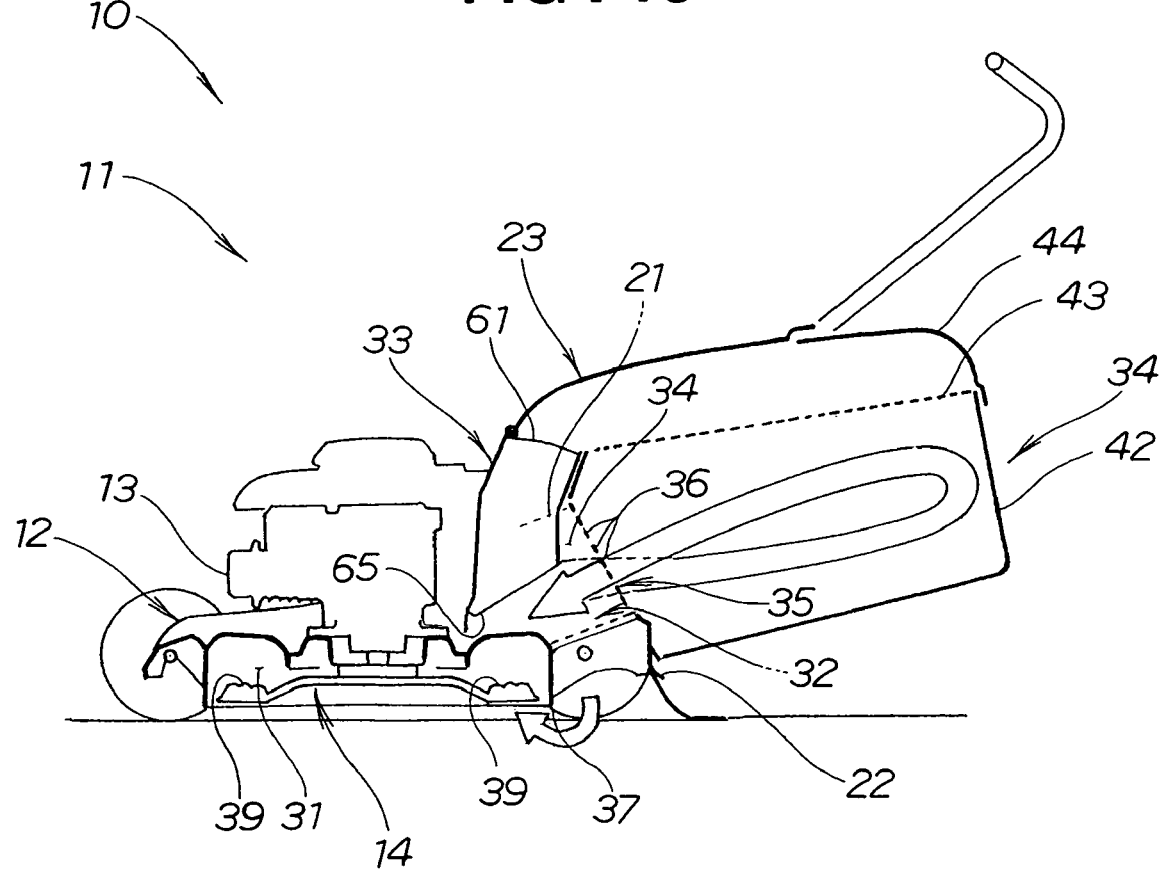
FIG. 10 is a schematic side sectional view showing flows of the carrier air, grass clippings and exhaust air at the beginning of the lawn mowing operation.

FIG. 10 is a side sectional view showing flows of carrier air, grass clippings and exhaust air at the beginning of the normal lawn mowing operation by the first embodiment of the lawn mower.

It was experimentally observed that, at the beginning of the lawn mowing operation, most of the carrier air directly hits a rear inner surface of the grass clipping collecting section 42 to flow back to the rear wall 35 of the cutter housing 12 since grass clippings have not yet accumulated in the collecting section 42. This is why the plurality of through-holes (i.e., auxiliary exhaust air return passages) 36 are formed in the rear wall 35 of the cutter housing 12 for returning the exhaust air to the lower end 35 of the cutter housing 12; in this way, even in a situation where grass clippings have not yet accumulated in the grass clipping collecting section 42, i.e. even when the exhaust air can not be easily returned via the (main) exhaust air return passage 33, the exhaust air is allowed to flow back to the cutter housing 12 through the auxiliary exhaust air return passages 36. As a consequence, the exhaust air returning circulation can be promoted with an enhanced reliability.

Figure 11A:
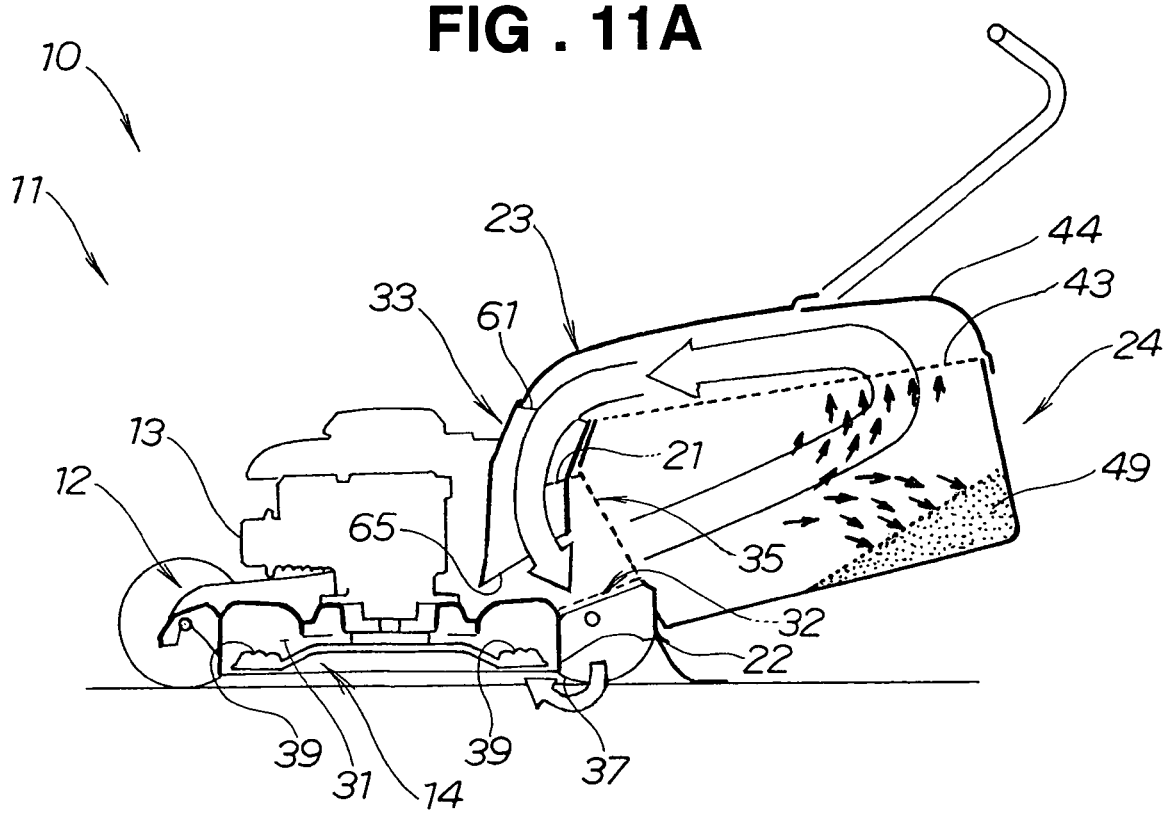
FIGS. 11A and 11B are side sectional views showing flows of the carrier air, grass clippings and exhaust air during the normal lawn mowing operation with the grass bag attached to a machine body and during "just-cutting" lawn mowing operation with the grass bag detached from the machine body.
Figure 11B:
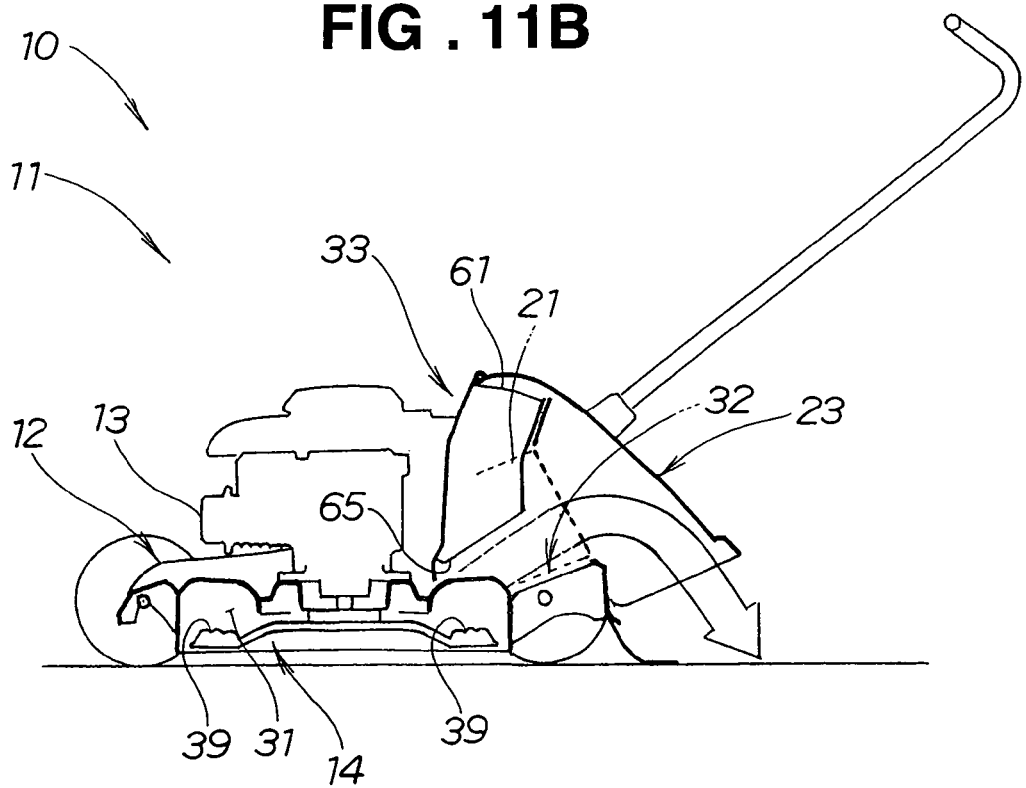

FIGS. 11A and 11B are side sectional views showing flows of carrier air, grass clippings and exhaust air during grass clipping discharge operation by the first embodiment of the lawn mower. FIG. 11A shows the lawn mower 10 with the grass bag 24 attached thereto, while FIG. 11B shows the lawn mower 10 with the grass bag 24 detached therefrom. On a grass farm or field or the like where grass clippings do not have to be collected into the grass bag 24 (see FIG. 2), for example, "just-cutting" lawn mowing operation is often performed with grass clippings left on a lawn surface (without being collected in the grass bag).

Thus, it is preferable to allow the exhaust-air-returning type lawn mower to be used in the "just-cutting" lawn mowing operation as well, because needs for a variety of different lawn mowing operation can be effectively dealt with and the lawn mower can achieve an enhanced convenience.

In the normal lawn mowing operation where the grass bag 24 is attached to the cutter housing 12 and exhaust air is to be returned from the attached grass bag 24 to the cutter housing 12, a part of the grass bag 24 is covered to appropriately return the exhaust air from the grass bag 24 to the exhaust air return passage 33, as illustrated in FIG. 11A. Namely, during the normal lawn mowing operation where exhaust air is to be returned from the attached grass bag 24 to the cutter housing 12, the discharge guard 23 functions as a passage member for returning the exhaust air.

In the just-cutting lawn mowing operation where grass clippings are discharged onto the ground surface with the grass bag 24 and cover member 44 detached, the discharge guard 23 is pivoted downwardly to close the exhaust air inlet 61 of the exhaust air return passage 33, as illustrated in FIG. 11B. Namely, in this case, the discharge guard 23 pivoted downwardly functions both as a lid member closing the exhaust air inlet 61 of the exhaust air return passage 33 and as a guide member for directing the grass clippings to the ground surface.

In the above-described manner, the lawn mower 10 of the present invention can also be used for the "just-cutting" lawn mowing operation where the grass bag 24 is not used, even though it is of the exhaust air circulation type. Thus, the present invention can appropriately deal with needs for a variety of different lawn mowing operation and can achieve an enhanced convenience of the lawn mower.

By the provision of the return spring 68 between the exhaust air return passage 33 and the discharge guard 23, as set forth above in relation to FIG. 5, the instant embodiment of the present invention can prevent the discharge guard 23 from being undesirably lifted and vibrated even during the just-cutting lawn mowing operation where the grass bag 24 is not used; namely, the instant embodiment can perform the just-cutting lawn mowing operation in an appropriate manner.

Figure 12:
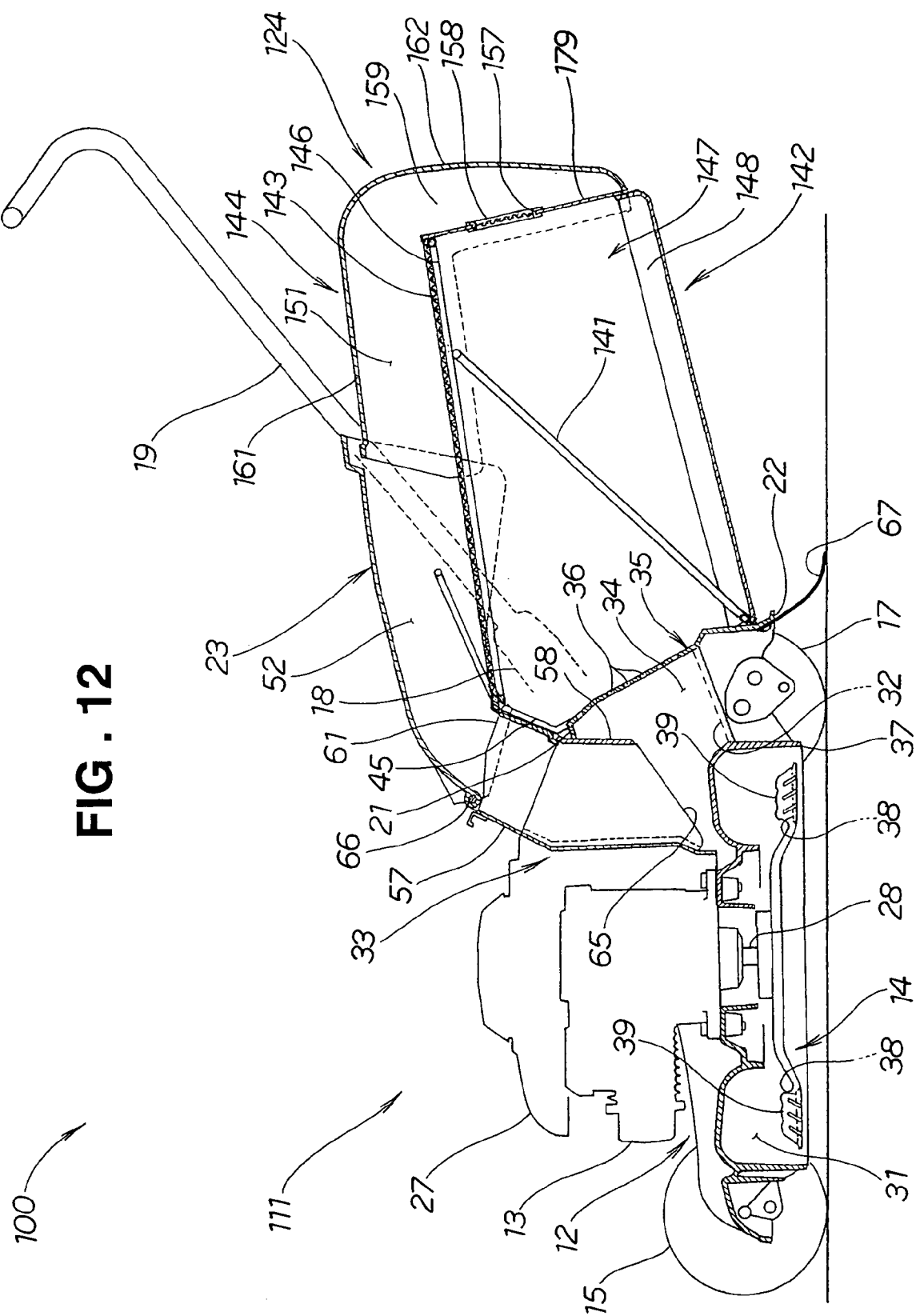
FIG. 12 is a sectional view showing a lawn mower according to a second embodiment of the present invention.
Figure 13:
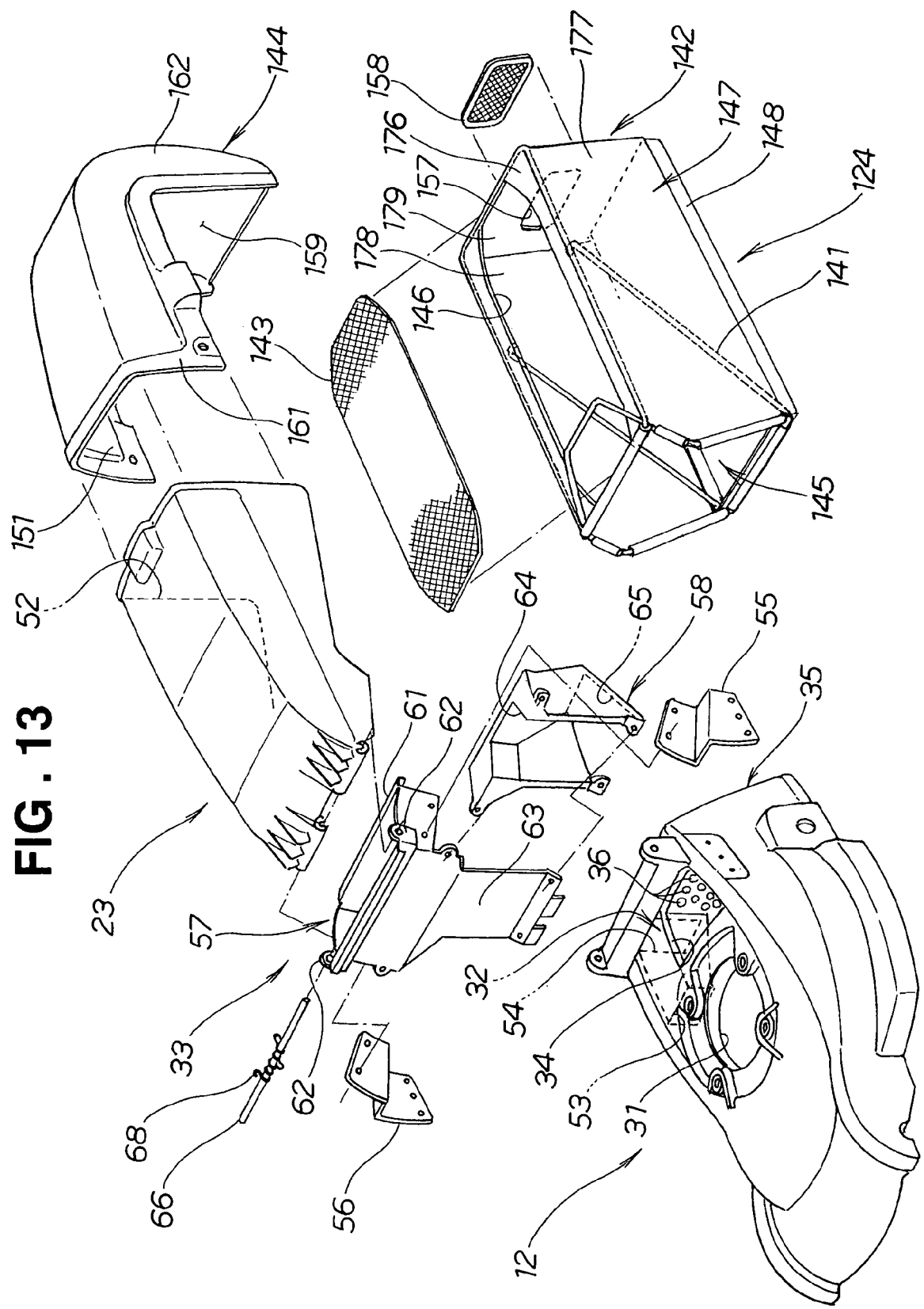
FIG. 13 is an exploded perspective view of a cutter housing, discharge guard and grass bag of FIG. 12.

FIGS. 12 and 13 are views showing a lawn mower 100 according to a second embodiment of the present invention. The same elements as in the first embodiment (see FIGS. 2 and 3) are indicated by the same reference numerals and will not be described in detail here to avoid unnecessary duplication. The second embodiment 100 is different from the first embodiment 10 primarily in the construction of the grass bag.

Referring to FIGS. 12 and 13, the grass bag 124 in the second embodiment, which is in the shape of a rectangular parallelepiped, has an opening portion 145 (FIG. 13) formed in a front region thereof and facing the grass clipping delivery passage 32.

As seen in FIG. 13, left and right side walls 177, 178, rear wall 179 and bottom section (bottom member) 148 of the grass bag 124 are all formed of a non-air-permeable material and together constitute the grass clipping collecting section 142 for collecting therein grass clippings.

Air-permeable netted member 143 is provided on the upper surface of the grass bag 124, and a rear opening portion 157 is formed in the rear wall 179 of the grass bag 124. Air-permeable rear netted member 158 is provided in the rear opening portion 157.

Cover member 144 having an "L" sectional shape covers the grass bag 124 from a substantial upper middle region of the netted member 143 to a lower end portion of the rear wall 179. Exhaust air conducting passage 151 communicating with the exhaust air return passage 33 is formed between the upper surface of the netted member 143 and the cover member 144. Further, a rear conducting passage 159 communicating with the exhaust air conducting passage 151 is formed between the cover member 144 and the rear wall 179 of the grass bag 124, and the rear opening portion 157 is covered with the cover member 144.

Reference numeral 111 represents a machine body of the lawn mower 100. As seen in FIG. 13, the grass bag 124 is detachably attachable to the rear wall 35 of the cutter housing 12.

The grass bag 124 includes a frame member 141 attachable to the cutter housing 12, the grass clipping collecting section 142 formed of a non-air-permeable material and attached to the frame member 141 for collecting therein grass clippings, the netted member 143 formed of an air-permeable material and disposed on the upper surface of the grass clipping collecting section 142, the above-mentioned cover member 144 covering the upper portion of the netted member 143 and rear wall 179 of the collecting section 142, and the rear netted member 158 mounted on the rear wall 179 defining the grass clipping collecting section 142.

The grass clipping collecting section 142 includes a body member 147 with its upper wall 176, left and right side walls 177, 178 and rear wall 179 formed of a non-air-permeable material. The grass clipping collecting section 142 also includes the bottom member 148 molded of resin, the above-mentioned front opening portion 145 that communicates with the grass clipping delivery passage 32 by being abutted against the rear wall 35 of the cutter housing 12, an upper opening portion 146 mounting thereon the netted member 143, and the rear opening portion 157 mounting thereon the rear netted member 158. The netted member 143 separates grass clippings and carrier air.

The cover member 144 includes an upper body 161 that covers a rear region of the upper opening portion 146 of the grass clipping collecting section 142 to thereby define, in conjunction with the netted member 143, the exhaust air conducting passage 151 for directing exhaust air to the exhaust air return passage 33, and a rear extension portion 162 that defines the rear conducting passage 159 by being mounted on the rear wall 179 of the grass clipping collecting section 142 in communication with the exhaust air conducting passage 151.

Figure 14:
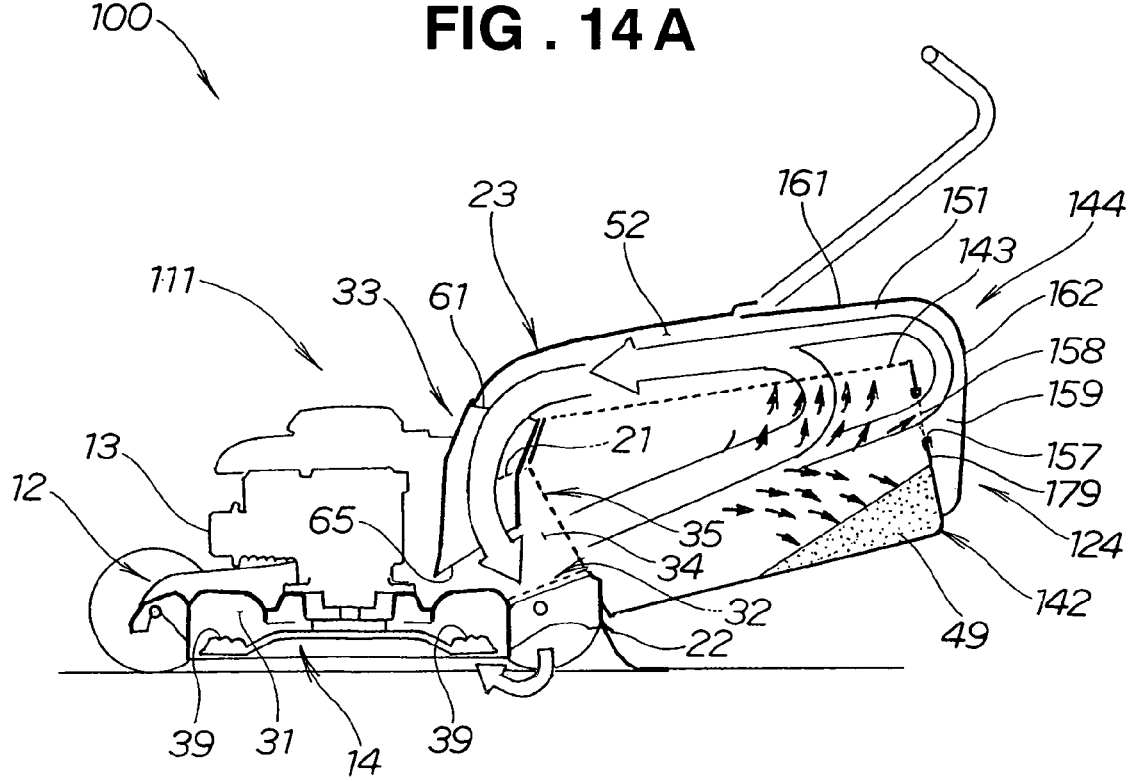
FIGS. 14A and 14B are views of carrier air, grass clippings and exhaust air during lawn mowing operation by the second embodiment of the lawn mower.
Figure 14:
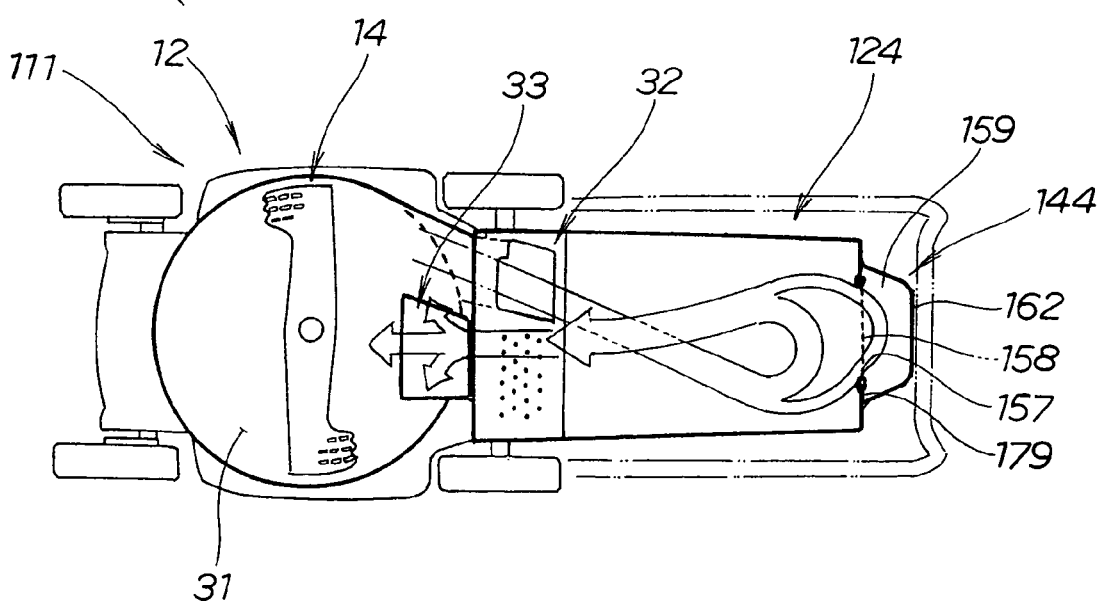

FIGS. 14A and 14B show flows of carrier air, grass clippings and exhaust air during the normal lawn mowing operation by the second embodiment of the lawn mower 100.

In FIG. 14A, grass is first cut by the cutter blade 14, and then the resultant grass clippings are delivered, with carrier air, to the grass clipping collecting section 142 of the grass bag 124 for collection therein. A portion of the carrier air is directed as exhaust air, through the netted member 143, to the exhaust air conducting passage 151, while the remaining portion of the carrier air flows, through the rear netted member 158, to the exhaust air conducting passage 151 by way of the rear conducting passage 159. Then, the exhaust air is directed from the exhaust air conducting passage 151, via the connection passage 52, to the exhaust air return passage 33. Then, the exhaust air is discharged from the exhaust air return passage 33 to the cavity section 34, from which the discharged exhaust air is sucked into the scroll section 31 producing a negative pressure.

After the grass clippings 49 have piled in the grass clipping collecting section 142, the carrier air is deflected upward by hitting the piled grass clippings 49, so that it flows through the netted member 143 into the exhaust air conducting passage 151. Before the grass clippings 49 accumulate in the grass clipping collecting section 142, the carrier air flows directly to the rear wall 179 of the grass clipping collecting section 142, so that it flows, through the rear netted member 158, to the exhaust air conducting passage 151 by way of the rear conducting passage 159.

Namely, the rear opening portion 157 is covered with the rear extension portion 162 extending from the upper body 161 of the cover member illustrated in FIG. 14B, so as to define the rear conducting passage 159 communicating with the exhaust air conducting passage 151 shown in FIG. 14A. In this way, the exhaust air can be returned to the exhaust air return passage 33 from the grass bag's rear wall 179 as well.

FIGS. 15-20B are views showing a lawn mower 200 according to a third embodiment of the present invention. The same elements as in the first embodiment of the lawn mower 10 (see FIG. 2) are indicated by the same reference numerals and will not be described in detail here to avoid unnecessary duplication. The third embodiment of the lawn mower 200 is different from the first embodiment 10 primarily in the construction of the grass bag.

Figure 15:
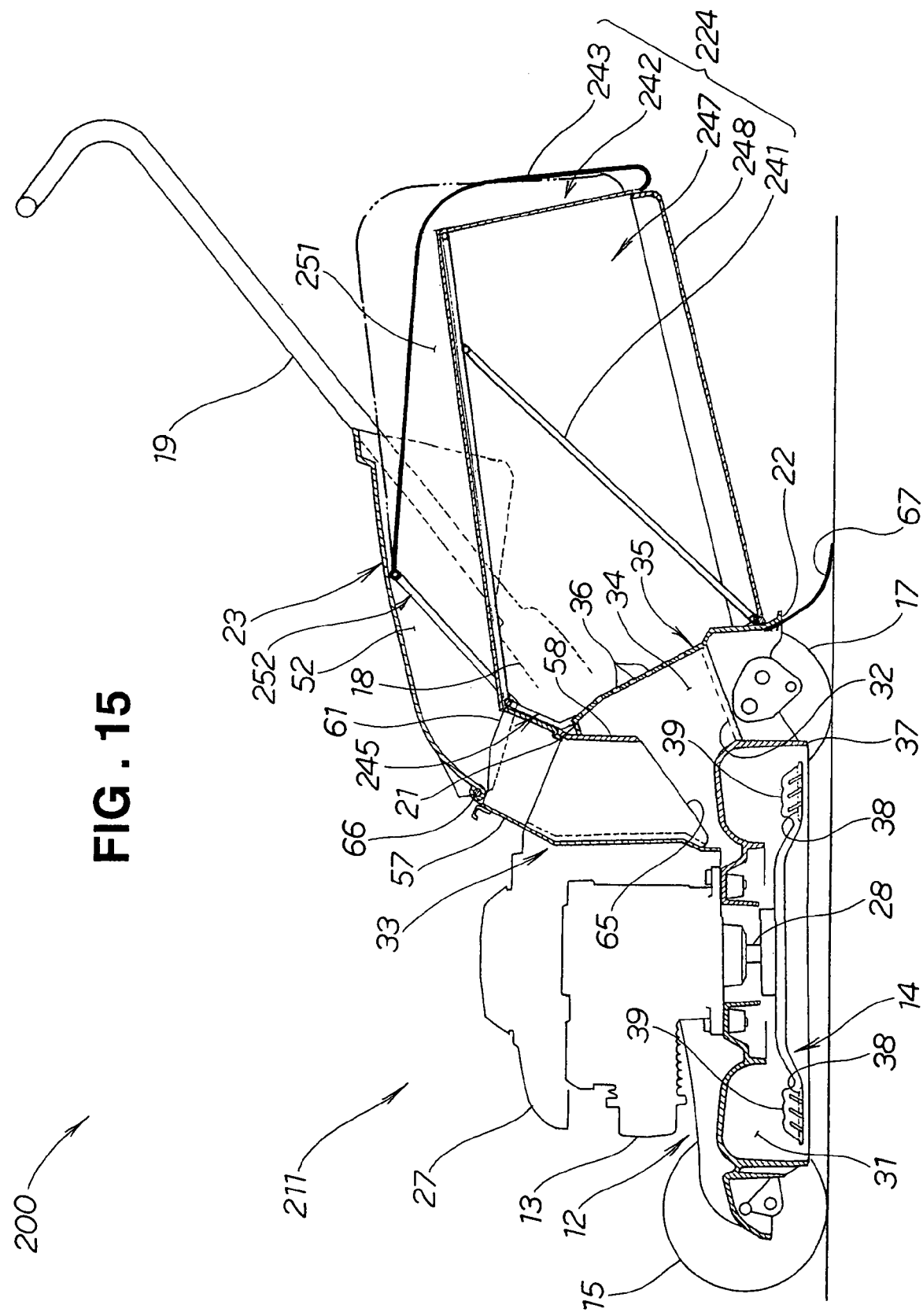
FIG. 15 is a sectional view showing a lawn mower according to a third embodiment of the present invention.

The grass bag 224 in the third embodiment of the lawn mower 200 shown in FIG. 15 includes an inner member 242 having a function for collecting grass clippings, an expandable/contractible outer member 243 covering a part of the inner member 242, and a frame member 241 supporting the inner and outer members 242 and 243 and detachably attachable to the rear wall 35 of the cutter housing 12.

Figure 16:
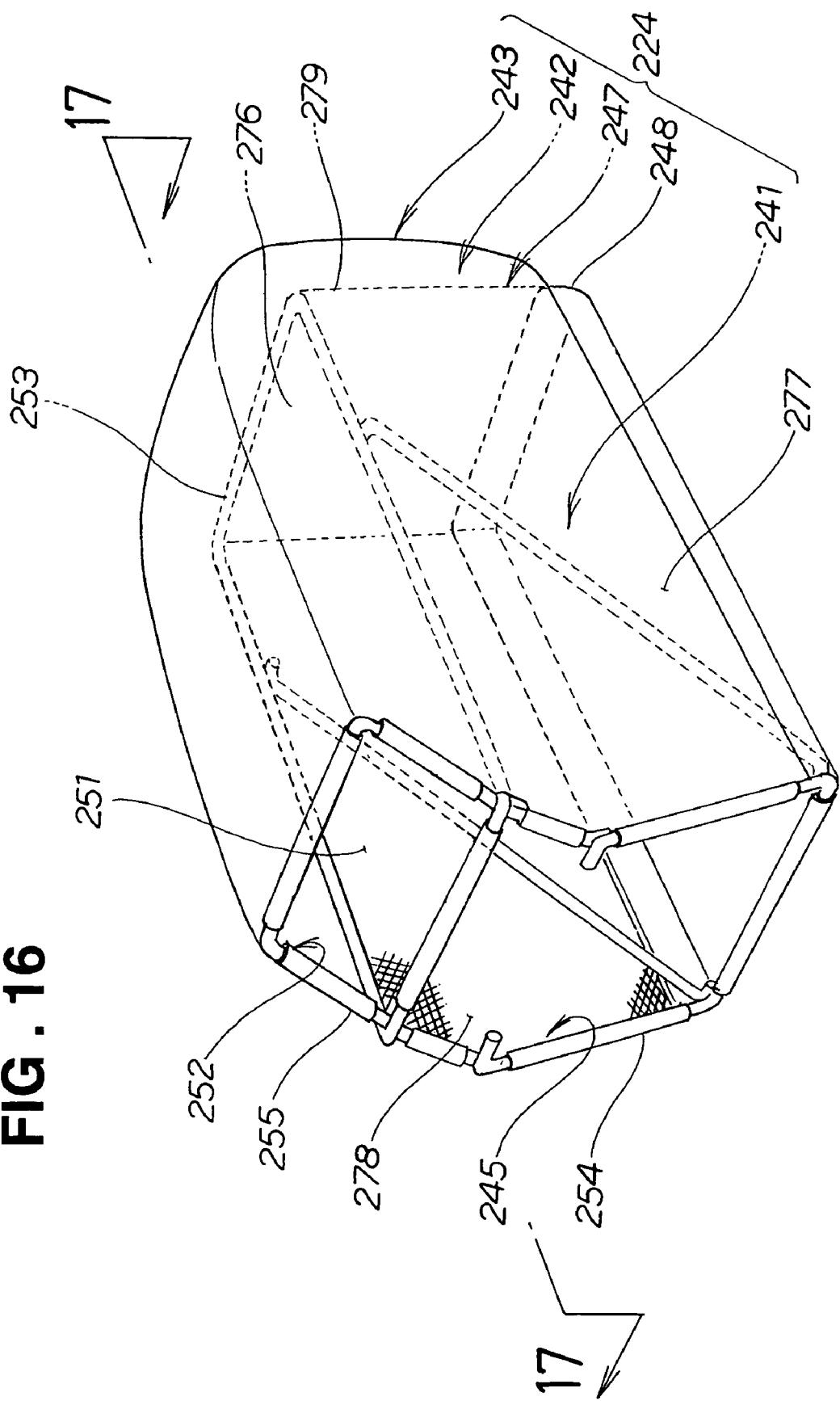
FIG. 16 is a perspective view of the third embodiment of the lawn mower.

As illustrated in FIG. 16, the inner member 242, which is in the shape of a rectangular parallelepiped, has an inner opening portion 245 formed in its front portion, an inner body section 247 having an upper wall 276, left and right side walls 277, 278 and rear wall 279 that are all formed of an air-permeable cloth, and a bottom section 248 formed of a non-air-permeable material. The inner member 242 has the grass clipping collecting function for collecting therein grass clippings by means of its lower section including the bottom section 248, and an exhaust air circulation function for returning exhaust air by means of its outer peripheral section comprising the upper, left and right and rear walls 276, 277, 278 and 279.

The inner opening portion 245 communicates with the grass clipping delivery passage 32 when the grass bag 224 is attached to the rear wall 35 of the cutter housing 12.

The outer member 243, which is formed of a non-air-permeable material, covers the outer peripheral surfaces of the upper, left and right and rear walls 276, 277, 278 and 279 with an appropriate space intervening between the outer member 243 and the peripheral surfaces. The outer member 243 is supported on the frame member 241 and bottom section 248 and includes an exhaust air conducting passage 251 for directing exhaust air separated from grass clippings, and an outer opening portion 252 for allowing the exhaust air conducting passage 251 to communicate with the exhaust air return passage 33 via the connection passage 52 (see FIG. 15).

The frame member 241 includes an inner support section 253 supporting thereon the inner body section 247, an inner opening frame 254 defining the inner opening portion 245, and an outer opening frame 255 defining the outer opening portion 252.

Figure 17:
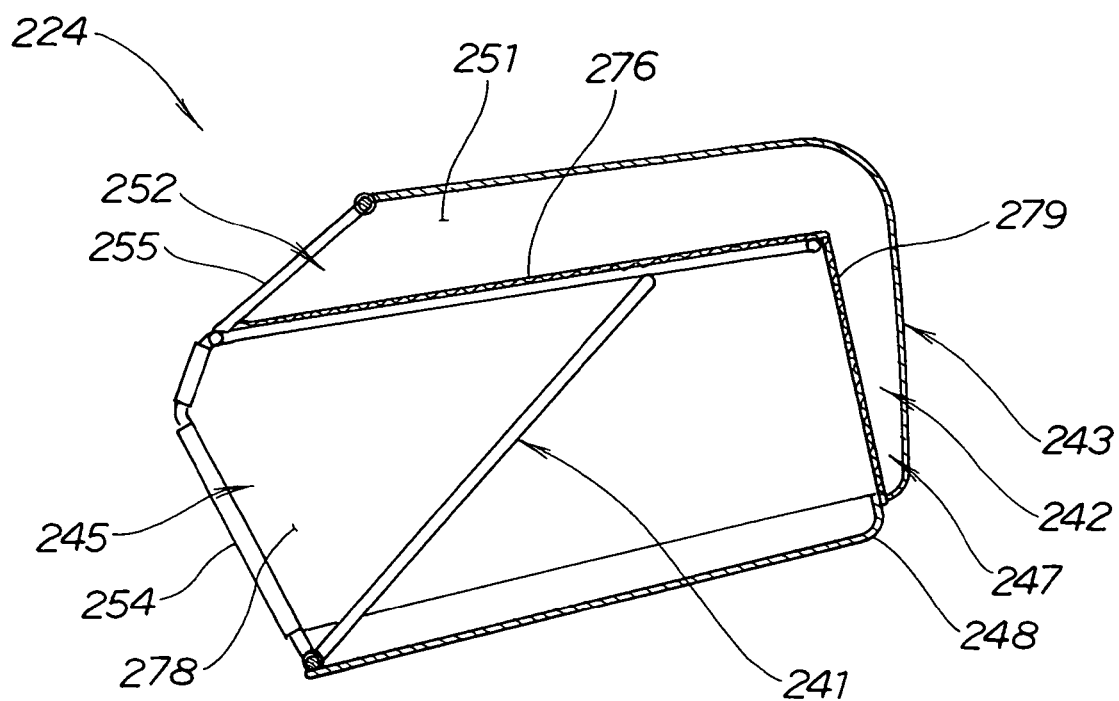
FIG. 17 is a sectional side view of the lawn mower taken along the 17-17 line of FIG. 16.

As seen in FIG. 17, the upper, left and right and rear walls 276, 277, 278 and 279 of the inner member 242 are formed of an air-permeable cloth material, while the bottom member 248 is in the form of a sheet made of a non-air-permeable material, such as resin or metal.

Figure 18:
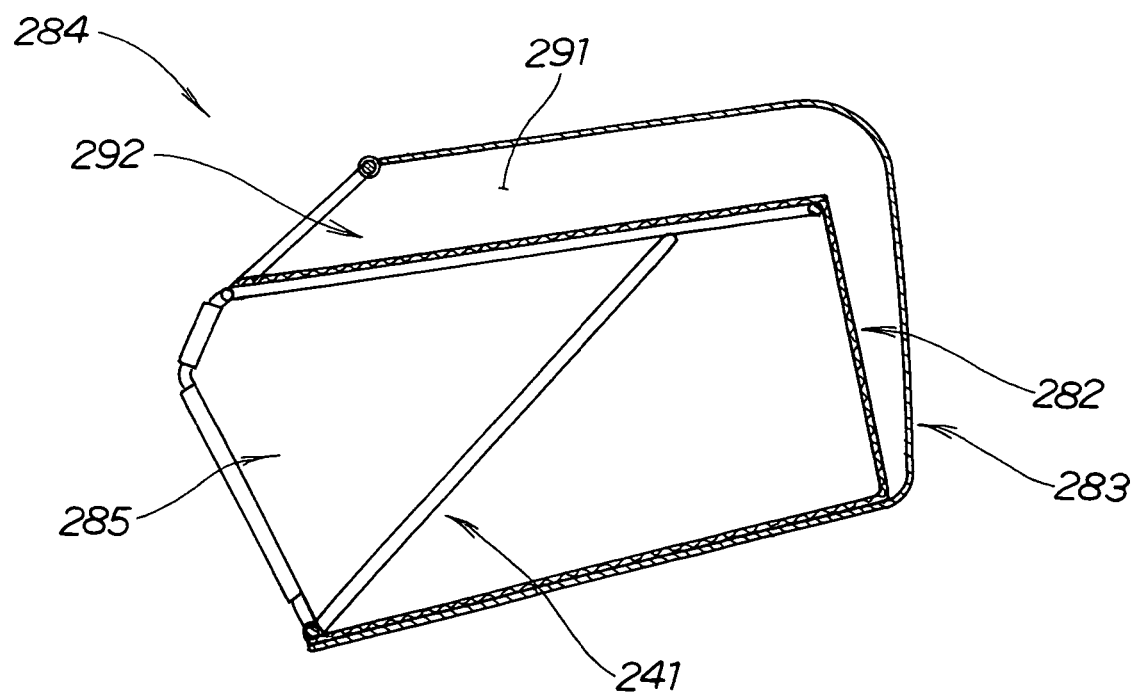
FIG. 18 is a view showing a modification of the grass bag in the third embodiment of the lawn mower.

FIG. 18 shows a modification of the grass bag employed in the third embodiment of the present invention. The modified grass bag 284 has the same function as the grass bag 224 employed in the third embodiment shown in FIG. 17. The grass bag 284 includes an inner member 282 formed of an air-permeable cloth material for collecting therein grass clippings, an expandable/contractible outer member 283 formed of a non-air-permeable material for covering an outer peripheral surface of the inner member 282 with an appropriate space intervening between the outer member 283 and the peripheral surface, and a frame member 241 supporting thereon the inner and outer members 282 and 283. Namely, the grass bag 284 is substantially a two-layer structure comprising the inner and outer members 282 and 283.

In FIG. 18, reference numeral 285 represents an inner opening portion, 292 an outer opening portion, 291 an exhaust air conducting passage defined by the inner and outer members 282 and 283. The exhaust air conducting passage 291 communicates, via the outer opening portion 292, with the exhaust air return passage 33 shown in FIG. 15.

Because the modified grass bag 284 is a two-layer structure comprising the inner member 282 formed of an air-permeable material for collecting therein grass clippings and the expandable/contractible outer member 283 formed of a non-air-permeable material for covering the outer peripheral surface of the inner member 282 other than the inner opening portion 285, the grass bag 284 can be reduced in weight and can be readily handled when, for example, discarding grass clippings therefrom.

Figure 19A:
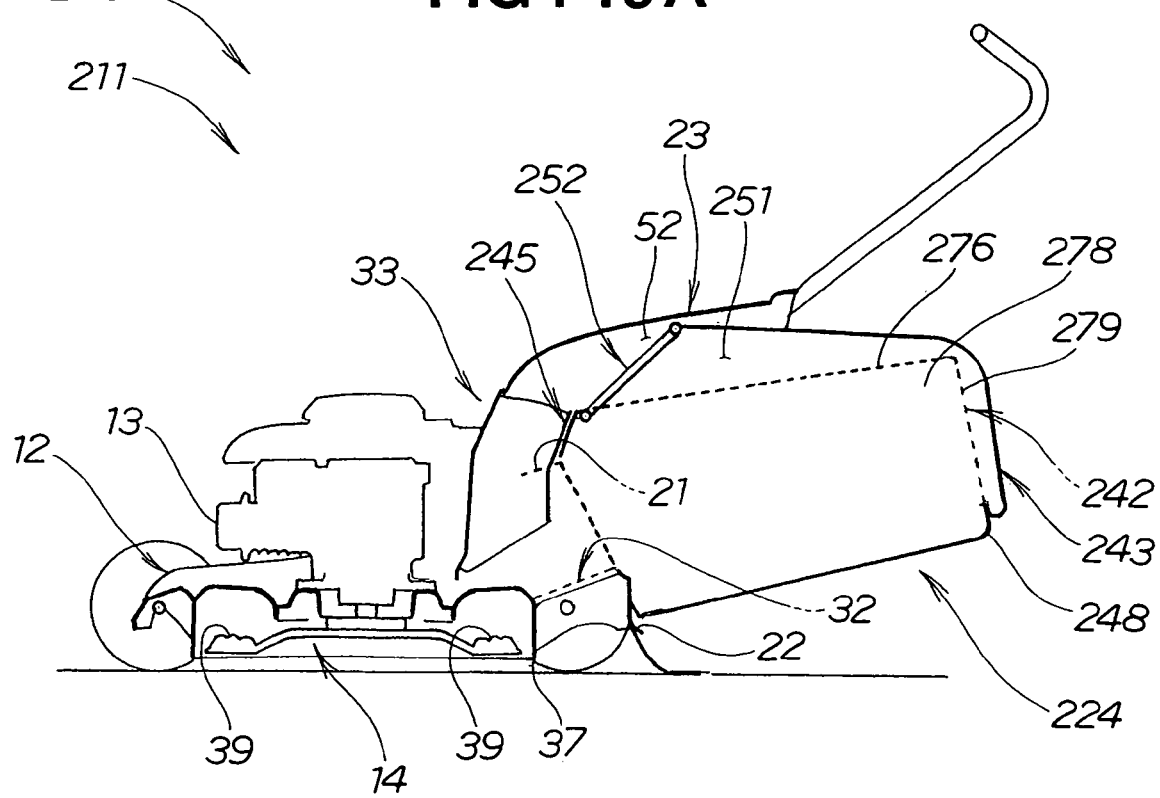
FIGS. 19A and 19B are views showing the third embodiment of the lawn mower before a start of lawn mowing operation.
Figure 19B:
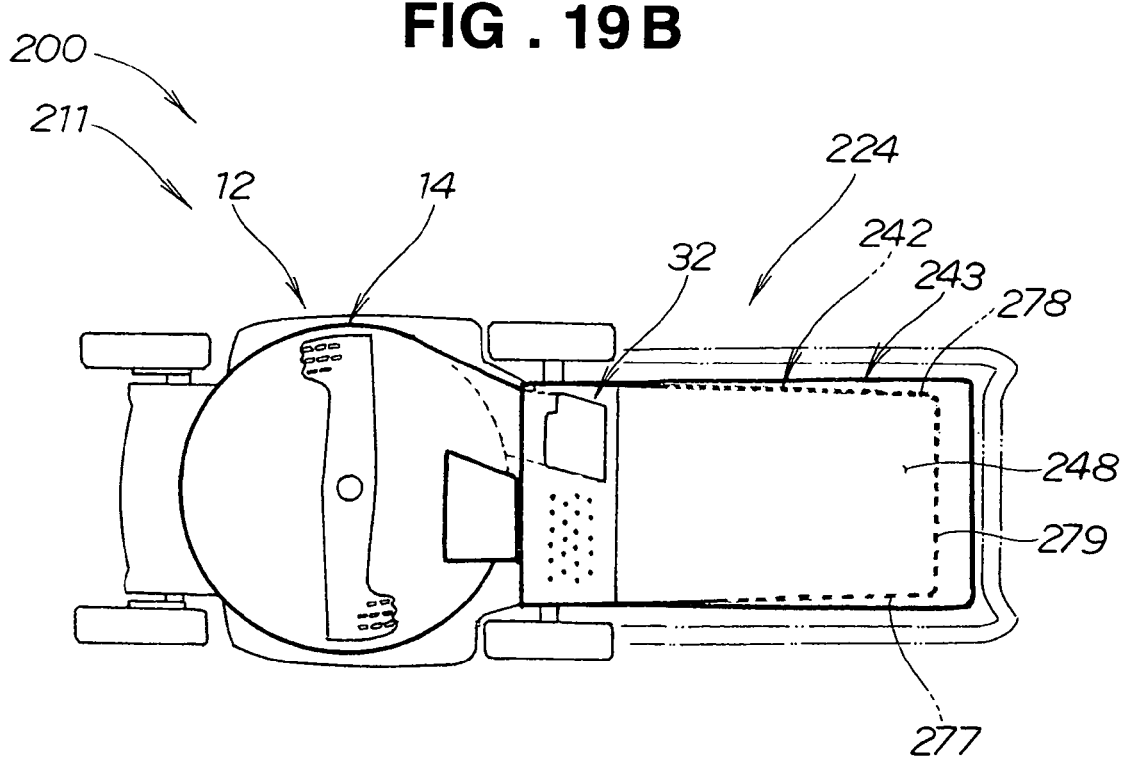

FIGS. 19A and 19B show the third embodiment of the lawn mower 200 before a start of the normal lawn mowing operation. In FIG. 19A, the inner member 242 is in communication with the grass clipping delivery passage 32 via the inner opening portion 245, so that grass clippings are delivered to the inner member 242. With the discharge guard 23 covering a front portion of the exhaust air conducting passage 251, it is possible to minimize the amount of exhaust air leaking out through the outer opening portion 252.

In FIG. 19B, the bottom section 248 of the inner member 242 is formed of a non-air-permeable material, and the upper, left and right and rear walls 276, 277, 278 and 279 of the inner member 242 are formed of an air-permeable material. Thus, carrier air, with which grass clippings have been carried, can be discharged as exhaust air to the outer member 243 through the upper, left and right and rear walls 276, 277, 278 and 279, with the grass clippings left within the inner member 242.

Further, the expandable/contractible outer member 243 can be folded in the contracted state during a non-operating period, so that a sufficient distance or space can be secured between an operating handle 19 (FIG. 1) and the grass bag 224. As a consequence, the attachment and detachment of the grass bag 224 is greatly facilitated. Further, by virtue of the sufficient space between the operating handle 19 (FIG. 1) and the grass bag 224, the machine body 211 can be handled with ease, and the lawn mower 200 can be readily taken onto a vehicle as necessary.

Figure 20A:
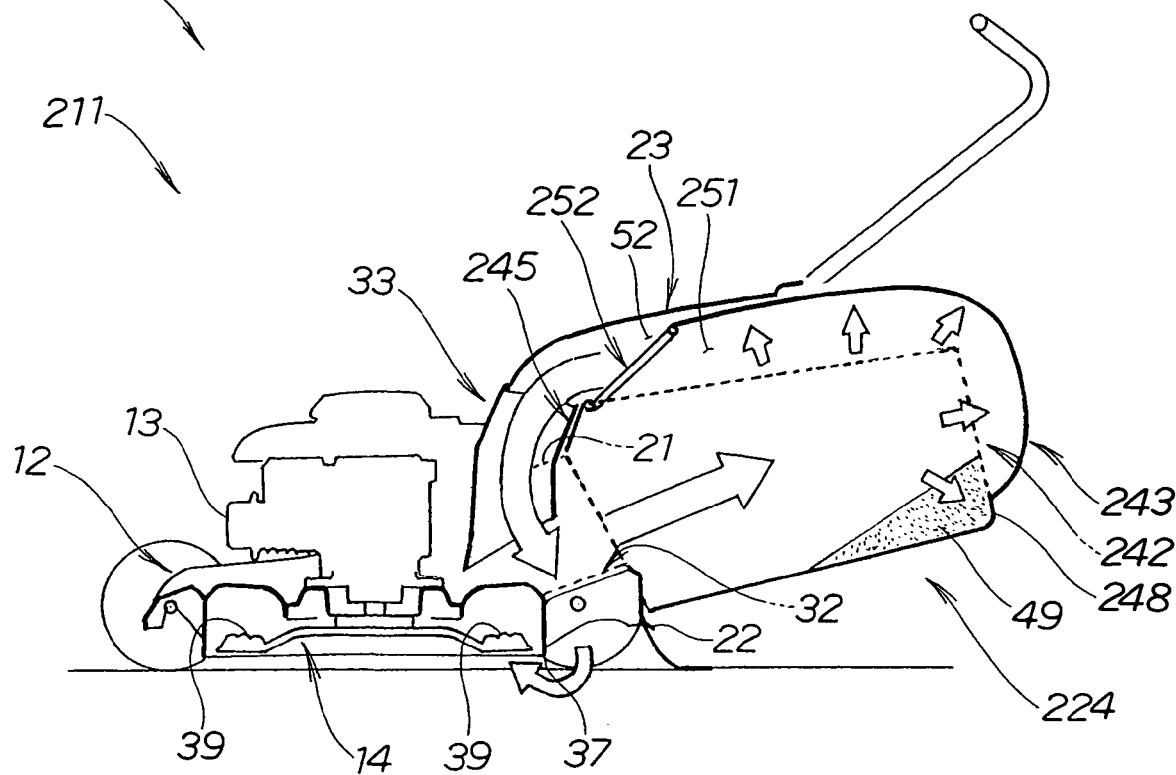
FIGS. 20A and 20B are views showing flows of carrier air, grass clippings and exhaust air during the lawn mowing operation by the third embodiment of the lawn mower.
Figure 20B:
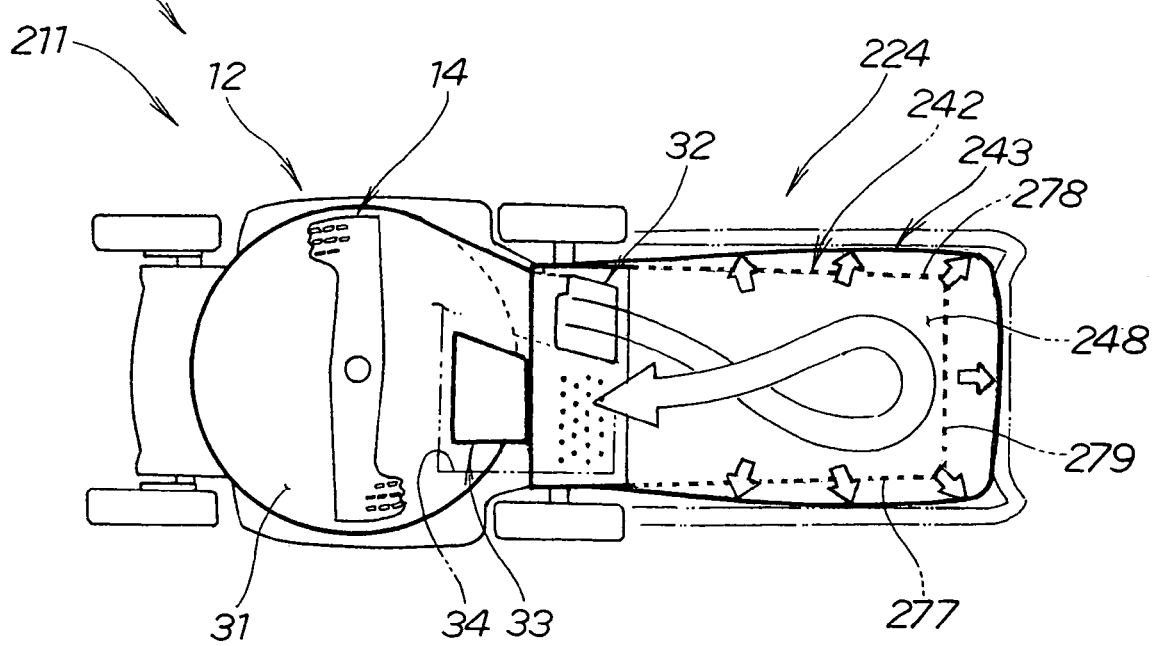
Figure 21:
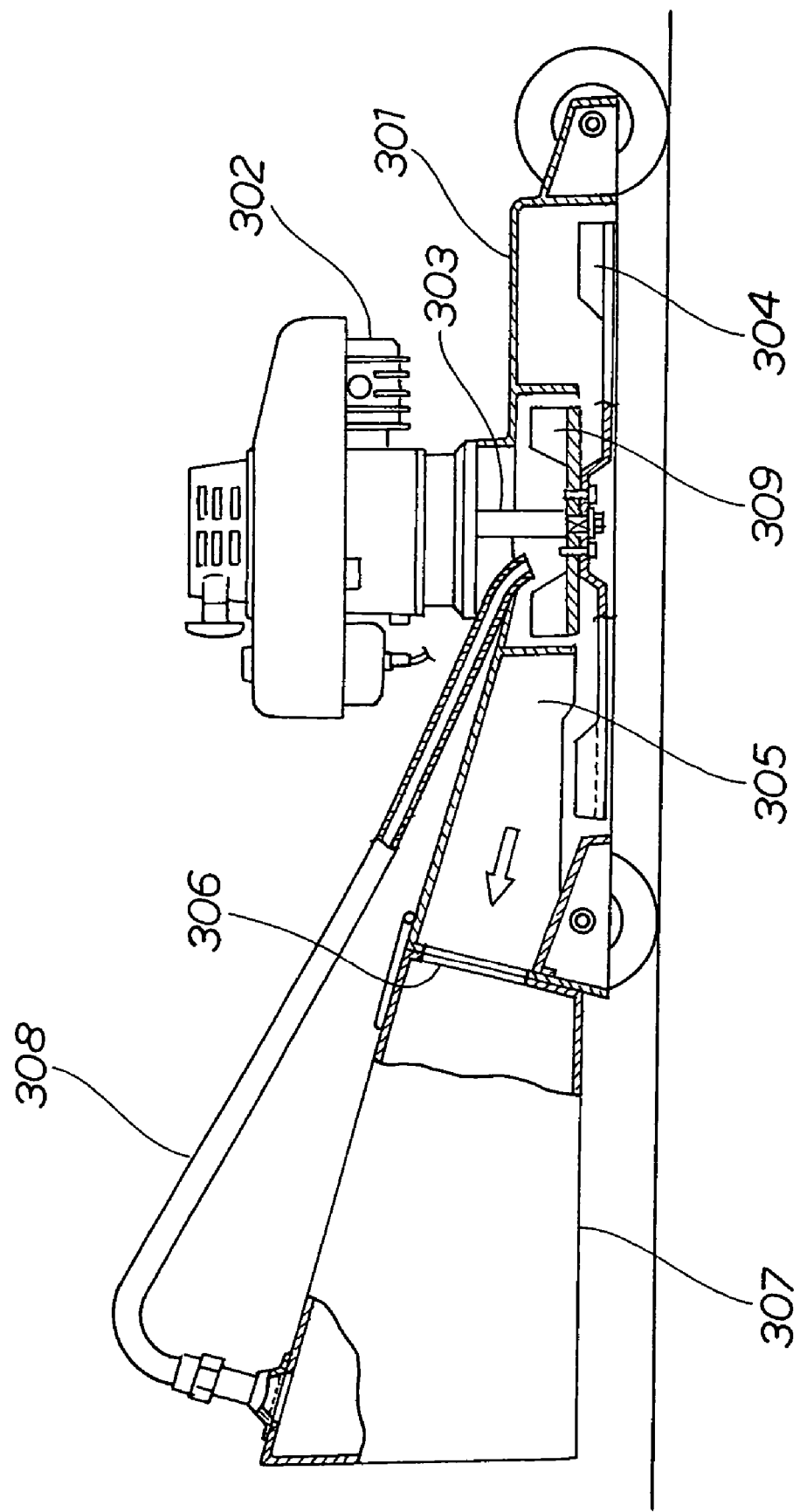
FIG. 21 is a partly-sectional view of a conventional lawn mower.
Figure 22:
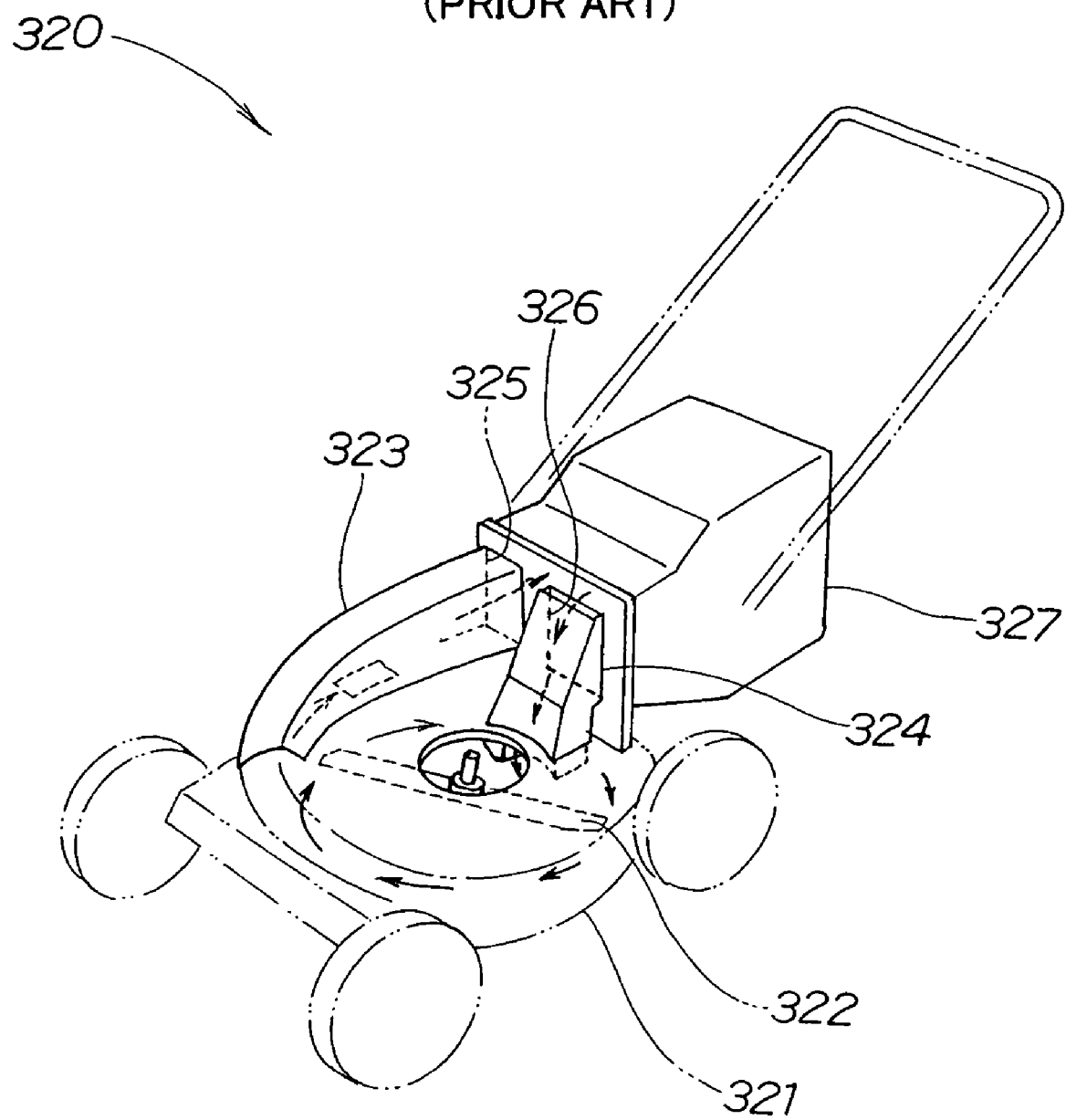
FIG. 22 is a partly-sectional view of another conventional lawn mower.

FIGS. 20A and 20B show flows of carrier air, grass clippings and exhaust air during the normal lawn mowing operation by the third embodiment of the lawn mower 200.

In FIG. 20A, grass is first cut by the cutter blade 14, and then the resultant grass clippings are delivered, with carrier air, into the inner member 242 for collection therein. The carrier air flows as exhaust air from the air-permeable inner member 242 to the non-air-permeable outer member 243. By the exhaust air flowing to the outer member 243, the outer member 243 expands to thereby form the exhaust air conducting passage 251. Then, the exhaust air is returned, through the exhaust air conducting passage 251, to the exhaust air return passage 33 via the connection passage 52. Therefore, the exhaust air can be prevented from being discharged from the grass bag 224, which can effectively reduce unwanted sound and dust discharged with the sound.

Furthermore, the expandable/contractible outer member 243 can closely contact the discharge guard 23 to thereby minimize leakage of the exhaust air.

During the operation, as seen in FIG. 20B, the non-air-permeable outer member 243 expands away from the inner member 242 so that a sufficient space is secured between the inner and outer members 242 and 243, and thus, all of the exhaust air can be returned to the exhaust air return passage 33 via the sufficient space.

Because the outer member 243 is expandable and contractible, only the outer member 243 expands during the operation to provide a sufficient sectional area of the exhaust air return passage for efficiently returning the exhaust air.

Further, an upper space portion defined between the inner and outer members 242 and 243 is where pressure would increase due to the returning flows of the exhaust air. Because the inner member 242 is supported at its upper portion by the frame member 241, the inner member 242 can be prevented from being deformed, so that a sufficient area of the upper space portion, i.e. the exhaust air conducting passage 251, can be secured.

Furthermore, as grass clippings pile up in the grass bag 224, the inner member 242 is packed or filled with the grass clippings, so that the pressure of the exhaust air weakens. Thus, the outer member 243 is brought into a slightly contracted state, on the basis of which it can be known that the grass bag 244 has been filled up with grass clippings. Namely, the expandable/contractible outer member 243 can also function as a sensor for detecting when the grass bag 244 has been filled up with grass clippings.

Whereas the first, second and third embodiments of the present invention have been described above as using the engine 13 as the driving power source, the present invention is not so limited; for example, the driving power source may be an electric motor driven by a battery or the like.

Further, the third embodiment has been described above in relation to the case where the grass bag 224 comprises the inner and outer members 242 and 243 and the exhaust air conducting passage 251 is formed outwardly of the upper wall 276, left and right side walls 277, 278 and rear wall 279 of the inner member 242, the present invention is not so limited. For example, the exhaust air conducting passage 251 may be formed over the upper wall of the inner member 242, or outwardly of the upper wall 276 and left and right side walls 277, 278, or outwardly of the upper wall 276 and rear wall 279 of the inner member 242.

Obviously, various minor changes and modifications of the present invention are possible in the light of the above teaching. It is therefore to be understood that within the scope of the appended claims the invention may be practiced otherwise than as specifically described.

What is claimed is:

1. A lawn mower comprising:
a machine body;
a grass bag detachably attached to the machine body for collecting therein grass clippings;
a driving power source mounted on the machine body;
a cutter blade driven by the driving power source for rotation to cut grass, the cutter blade having air lifting sections disposed at opposite end portions thereof for producing carrier air during rotation of the cutter blade; and
a cutter housing covering the cutter blade, the cutter housing having a grass clipping delivery passage for directing grass clippings to the grass bag with the carrier air produced by the air lifting sections of the cutter blade, an exhaust air return passage for returning only the carrier air, as exhaust air, from the grass bag to the cutter housing, a cavity section communicating with the exhaust air return passage, and a rear wall having a plurality of through-holes communicating with the cavity section for auxiliarily returning the exhaust air from the grass bag into the cutter housing, the grass clipping delivery passage extending in a front-and-rear direction of the cutter housing, the exhaust air return passage being disposed adjacent to and extending substantially perpendicular to the grass clipping delivery passage, and the exhaust air return passage having an exhaust air inlet disposed in a rear upper surface portion of the cutter housing and an exhaust air outlet facing a rear lower end of the cutter housing.

2. A lawn mower as claimed in claim 1; wherein the grass bag is substantially in a shape of a rectangular parallelepiped, the grass bag having an opening portion formed in a front region thereof and communicating with the grass clipping delivery passage, left and right side walls and a bottom section that are formed of a non-air-permeable material, a netted member formed of an air-permeable material and disposed on an upper portion of the grass bag, a cover member formed of a non-air-permeable material and covering an upper surface portion of the netted member, and an exhaust air conducting passage disposed between the netted member and the cover member in communication with the exhaust air return passage and having a closable rear portion.

3. A lawn mower as claimed in claim 1; wherein the grass bag has an inner member generally in a shape of a rectangular parallelepiped and an expandable outer member covering an outer peripheral surface of the inner member; wherein the inner member has an upper portion, left and right side walls and a rear wall formed of an air-permeable material, a bottom section formed of a non-air-permeable material, and an inner opening portion formed in a front region of the grass bag in communication with the grass clipping delivery passage; and wherein the outer member is formed of a non-air-permeable material and covers outer peripheral surfaces of the upper portion, left and right side walls and rear wall of the inner member with a space interposed between the outer member and the outer peripheral surfaces, the outer member having an outer opening portion formed near the inner member in communication with the exhaust air return passage.

4. A lawn mower as claimed in claim 3; wherein the bottom section of the inner member is formed integrally with and of the same material as the upper portion, left and right side walls and rear wall of the inner member, the bottom section being covered with the outer member so as to provide a non-air-permeable bottom of the grass bag.

5. A lawn mower as claimed in claim 1; further comprising a discharge guard pivotably mounted to the exhaust air inlet of the exhaust air return passage of the cutter housing for, during operation with the grass bag attached to the machine body, covering a part of the grass bag to direct the exhaust air from the grass bag to the exhaust air return passage, and for, during operation with the grass bag detached from the machine body so that grass clippings are discarded onto a ground surface, closing the exhaust air inlet to direct the grass clippings onto the ground surface.

6. A lawn mower comprising:
a machine body;
a grass bag detachably attached to the machine body for collecting therein grass clippings;
a driving power source mounted on the machine body;
a cutter blade driven by the driving power source for rotation to cut grass, the cutter blade having air lifting sections disposed at opposite end portions thereof for producing carrier air during rotation of the cutter blade; and
a cutter housing covering the cutter blade, the cutter housing having a grass clipping delivery passage for directing grass clippings to the grass bag with the carrier air produced by the air lifting sections of the cutter blade, an exhaust air return passage for returning only the carrier air, as exhaust air, from the grass bag to the cutter housing, a cavity section communicating with the exhaust air return passage, and a wall portion having a plurality of through-holes communicating with the cavity section for auxiliarily returning the exhaust air from the grass bag into the cutter housing.

7. A lawn mower as claimed in claim 6; wherein the exhaust air return passage is disposed adjacent to and substantially perpendicular to the grass clipping delivery passage.

8. A lawn mower as claimed in claim 6; wherein the grass bag is substantially in a shape of a rectangular parallelepiped, the grass bag having an opening portion formed in a front region thereof and communicating with the grass clipping delivery passage of the cutter housing, a pair of side walls and a bottom section that are formed of a non-air-permeable material, a netted member formed of an air-permeable material and disposed on an upper portion of the grass bag, a cover member formed of a non-air-permeable material and covering an upper surface portion of the netted member, and an exhaust air conducting passage disposed between the netted member and the cover member in communication with the exhaust air return passage of the cutter housing and having a closable rear portion.

9. A lawn mower as claimed in claim 6; wherein the grass bag has an inner member generally in a shape of a rectangular parallelepiped and an expandable outer member covering an outer peripheral surface of the inner member; wherein the inner member has an upper portion, a pair of side walls and a rear wall formed of an air-permeable material, a bottom section formed of a non-air-permeable material, and an inner opening portion formed in a front region of the grass bag in communication with the grass clipping delivery passage of the cutter housing; and wherein the outer member is formed of a non-air-permeable material and covers outer peripheral surfaces of the upper portion, side walls and rear wall of the inner member with a space interposed between the outer member and the outer peripheral surfaces, the outer member having an outer opening portion formed near the inner member in communication with the exhaust air return passage of the cutter housing.

10. A lawn mower as claimed in claim 9; wherein the bottom section of the inner member is formed integrally with and of the same material as the upper portion, side walls and rear wall of the inner member, the bottom section being covered with the outer member so as to provide a non-air-permeable bottom of the grass bag.

11. A lawn mower as claimed in claim 6; further comprising a discharge guard pivotably mounted to an exhaust air inlet of the exhaust air return passage of the cutter housing for, during operation with the grass bag attached to the machine body, covering a part of the grass bag to direct the exhaust air from the grass bag to the exhaust air return passage, and for, during operation with the grass bag detached from the machine body so that grass clippings are discarded onto a ground surface, closing the exhaust air inlet to direct the grass clippings onto the ground surface.

* * * * *